United States Patent [19]
Hollenbeck

[11] Patent Number: 5,676,069
[45] Date of Patent: Oct. 14, 1997

US005676069A

[54] SYSTEMS AND METHODS FOR CONTROLLING A DRAFT INDUCER FOR A FURNACE

[75] Inventor: Robert K. Hollenbeck, Fort Wayne, Ind.

[73] Assignee: General Electric Company, Fort Wayne, Ind.

[21] Appl. No.: 552,943

[22] Filed: Nov. 3, 1995

Related U.S. Application Data

[63] Continuation-in-part of Ser. No. 477,374, Jun. 7, 1995, Ser. No. 431,063, Apr. 28, 1995, Ser. No. 402,998, Mar. 9, 1995, Pat. No. 5,616,995, and Ser. No. 299,528, Sep. 1, 1994, Pat. No. 5,557,182, said Ser. No. 477,374, is a continuation-in-part of Ser. No. 299,528, Ser. No. 402,998, and Ser. No. 431,063, which is a continuation-in-part of Ser. No. 25,371, Feb. 26, 1993, Pat. No. 5,418,438, Ser. No. 299,528, Ser. No. 397,686, Mar. 1, 1995, abandoned, and Ser. No. 402,998, said Ser. No. 299,528, is a continuation-in-part of Ser. No. 25,371, said Ser. No. 402,998, is a continuation-in-part of Ser. No. 25,371, Ser. No. 299,528, Ser. No. 352,393, Dec. 8, 1994, and Ser. No. 397,686, which is a continuation-in-part of Ser. No. 25,371, Ser. No. 299,528, and Ser. No. 352,393, which is a continuation-in-part of Ser. No. 23,790, Feb. 22, 1993, abandoned.

[51] Int. Cl.⁶ .................................. G05D 23/00
[52] U.S. Cl. ............... 110/147; 126/116 A; 236/15 BD; 432/47
[58] Field of Search ............... 237/2 A; 126/116 A; 236/15 BD; 110/147; 432/47; 318/254

[56] References Cited

U.S. PATENT DOCUMENTS

| | | | |
|---|---|---|---|
| 2,679,607 | 5/1954 | Potter | 310/218 |
| 3,426,273 | 2/1969 | Kuntz et al. | 324/68 |
| 3,517,308 | 6/1970 | Mirdadian | 324/68 |
| 3,550,426 | 12/1970 | Griffo | 73/3 |
| 3,678,352 | 7/1972 | Bedford | 318/254 X |
| 3,679,953 | 7/1972 | Bedford | 318/254 X |
| 3,740,629 | 6/1973 | Kohlhagen | 318/138 |

(List continued on next page.)

FOREIGN PATENT DOCUMENTS

| | | | |
|---|---|---|---|
| 0073717 | 8/1982 | European Pat. Off. | F23N 1/06 |
| 0279771 | 2/1988 | European Pat. Off. | F23N 1/04 |
| 0433965A1 | 12/1990 | European Pat. Off. | G05B 19/04 |
| 2547075 | 6/1983 | France | G05B 19/18 |
| 2662751 | 5/1991 | France | F04D 27/00 |
| 3314300A1 | 10/1984 | Germany | H03K 5/01 |
| 8714498 | 12/1987 | Germany | H02P 7/63 |
| 1064583 | 9/1987 | Japan | H02P 6/02 |
| 1268482 | 4/1988 | Japan | H02P 6/02 |
| 2056044 | 7/1980 | United Kingdom | F23N 1/06 |

OTHER PUBLICATIONS

R. Itoh et al., "Single–Phase Sinusoidal Rectifier With Step–up/down Characteristics," Nov. 1991, IEEE Proceedings–B, vol. 138, No. 6.

*Primary Examiner*—Henry A. Bennett
*Assistant Examiner*—Derek S. Boles
*Attorney, Agent, or Firm*—Ralph E. Krisher, Jr.

[57] ABSTRACT

Systems and methods for controlling a draft inducer for use with a furnace. The draft inducer includes a motor for driving a fan for inducing a draft in the furnace that causes a pressure drop across the heat exchanger of the furnace. A memory stores information including a table of predefined speed/torque values for defining a set of speed/torque curves for operating the motor. A pressure switch provides a pressure signal representative of a reference pressure across the heat exchanger and a processor determines the speed and torque of the motor when the pressure drop corresponds to the reference pressure. In response to the determined motor speed and motor torque, the processor retrieves a parameter defining at least one delta value from the memory. The processor adapts the predefined speed/torque values as a function of the delta value thereby to define the speed/torque curves corresponding to a desired pressure drop. A control circuit generates a motor control signal in response to the defined speed/torque curves to cause the motor to operate as a function of the determined motor speed and motor torque for controlling the draft induced in the combustion chamber.

23 Claims, 18 Drawing Sheets

OTHER PUBLICATIONS

| Patent No. | Date | Inventor | Class |
|---|---|---|---|
| 3,765,234 | 10/1973 | Sievert | 73/136 R |
| 3,818,298 | 6/1974 | Eriksson | 318/227 |
| 3,818,310 | 6/1974 | Smith | 321/18 |
| 3,824,446 | 7/1974 | Forster et al. | 318/138 X |
| 3,849,718 | 11/1974 | Forster et al. | 318/138 X |
| 3,859,549 | 1/1975 | Boesel | 310/218 |
| 3,859,577 | 1/1975 | Wiart | 318/138 |
| 3,866,099 | 2/1975 | Bourbeau | 318/138 |
| 3,879,646 | 4/1975 | Wiart | 318/138 X |
| 3,940,680 | 2/1976 | Tadokoro et al. | 318/254 X |
| 3,995,130 | 11/1976 | Graf | 318/332 |
| 4,005,347 | 1/1977 | Erdman | 318/254 |
| 4,009,825 | 3/1977 | Coon | 165/22 |
| 4,012,677 | 3/1977 | Rist et al. | 318/434 |
| 4,030,005 | 6/1977 | Doemen | 318/138 |
| 4,044,287 | 8/1977 | Ratzel et al. | 318/432 |
| 4,097,789 | 6/1978 | Doeman | 318/461 |
| 4,099,111 | 7/1978 | Inaba et al. | 318/338 |
| 4,119,892 | 10/1978 | Saito et al. | 318/138 |
| 4,167,691 | 9/1979 | Sorensen et al. | 318/138 |
| 4,169,990 | 10/1979 | Lerdman | 318/138 |
| 4,253,053 | 2/1981 | Ray et al. | 318/254 X |
| 4,274,036 | 6/1981 | Fukasaku et al. | 318/331 |
| 4,360,770 | 11/1982 | Ray et al. | 318/254 X |
| 4,371,823 | 2/1983 | Lohest | 318/434 |
| 4,374,347 | 2/1983 | Mueller | 318/138 |
| 4,376,261 | 3/1983 | vonder Heide et al. | 318/254 |
| 4,379,984 | 4/1983 | Mueller | 318/254 |
| 4,384,241 | 5/1983 | Stillhard | 318/138 |
| 4,389,886 | 6/1983 | Korczak | 73/168 |
| 4,390,826 | 6/1983 | Erdman et al. | 318/439 |
| 4,392,417 | 7/1983 | Johannsen | 98/1.5 |
| 4,401,933 | 8/1983 | Davy et al. | 318/778 |
| 4,449,079 | 5/1984 | Erdman | 318/138 |
| 4,467,657 | 8/1984 | Olsson | 73/861 |
| 4,499,407 | 2/1985 | Macleod | 318/254 |
| 4,500,821 | 2/1985 | Bitting et al. | 318/254 |
| 4,504,881 | 3/1985 | Wada et al. | 361/23 |
| 4,519,540 | 5/1985 | Bouelle et al. | 237/7 |
| 4,520,296 | 5/1985 | Lepper et al. | 318/254 |
| 4,533,986 | 8/1985 | Jones | 363/17 |
| 4,535,275 | 8/1985 | Muller | 318/254 |
| 4,540,921 | 9/1985 | Boyd, Jr. et al. | 318/254 |
| 4,544,868 | 10/1985 | Murty | 318/254 |
| 4,556,827 | 12/1985 | Erdman | 318/254 |
| 4,558,264 | 12/1985 | Weischedel | 318/254 |
| 4,563,619 | 1/1986 | Davis et al. | 318/138 |
| 4,578,623 | 3/1986 | Tsukutani et al. | 318/254 |
| 4,638,233 | 1/1987 | Erdman | 318/644 |
| 4,644,233 | 2/1987 | Suzuki | 318/254 |
| 4,645,450 | 2/1987 | West | 431/12 |
| 4,648,551 | 3/1987 | Thompson et al. | 236/49 |
| 4,651,079 | 3/1987 | Wills | 318/811 |
| 4,654,566 | 3/1987 | Erdman | 318/254 |
| 4,667,480 | 5/1987 | Bessler | 62/180 |
| 4,678,974 | 7/1987 | Guastadini | 318/254 |
| 4,703,747 | 11/1987 | Thompson et al. | 126/112 |
| 4,704,567 | 11/1987 | Suzuki et al. | 318/254 |
| 4,707,650 | 11/1987 | Bose | 318/254 |
| 4,710,684 | 12/1987 | Okita et al. | 318/254 |
| 4,729,207 | 3/1988 | Dempsey et al. | 126/112 |
| 4,733,146 | 3/1988 | Hamby | 318/393 |
| 4,734,627 | 3/1988 | Koerner | 318/254 |
| 4,737,674 | 4/1988 | Miyao | 310/268 |
| 4,743,815 | 5/1988 | Gee et al. | 318/254 |
| 4,748,388 | 5/1988 | Muller | 318/254 |
| 4,755,728 | 7/1988 | Ban | 318/254 |
| 4,757,241 | 7/1988 | Young | 318/254 |
| 4,774,656 | 9/1988 | Quatse et al. | 364/900 |
| 4,806,833 | 2/1989 | Young | 318/335 |
| 4,818,924 | 4/1989 | Burney | 318/561 |
| 4,820,317 | 4/1989 | Fahey | 55/21 |
| 4,835,448 | 5/1989 | Dishner et al. | 318/254 |
| 4,836,096 | 6/1989 | Avery | 98/34.5 |
| 4,851,751 | 7/1989 | Gipson | 318/599 |
| 4,858,676 | 8/1989 | Bolfik et al. | 165/2 |
| 4,860,231 | 8/1989 | Ballard et al. | 364/571.01 |
| 4,870,332 | 9/1989 | Coghran et al. | 318/254 |
| 4,891,537 | 1/1990 | Shiraki et al. | 318/138 X |
| 4,935,861 | 6/1990 | Johnson, Jr. et al. | 363/132 |
| 4,937,467 | 6/1990 | Tuska et al. | 307/264 |
| 4,940,912 | 7/1990 | Kant et al. | 318/138 X |
| 4,972,134 | 11/1990 | Getz et al. | 318/817 |
| 4,978,896 | 12/1990 | Shah | 318/254 |
| 5,005,115 | 4/1991 | Schauder | 363/159 |
| 5,019,757 | 5/1991 | Beifus | 318/254 |
| 5,057,733 | 10/1991 | Sonoda et al. | 310/269 |
| 5,075,608 | 12/1991 | Erdman et al. | 318/599 |
| 5,075,610 | 12/1991 | Harris | 318/701 |
| 5,086,265 | 2/1992 | Uhlendorf | 318/817 |
| 5,097,168 | 3/1992 | Takekoshi et al. | 310/254 |
| 5,144,543 | 9/1992 | Striek et al. | 363/16 |
| 5,268,623 | 12/1993 | Muller | 318/254 |
| 5,331,944 | 7/1994 | Kujawa et al | 126/110 R |
| 5,373,205 | 12/1994 | Busick et al. | 318/434 |

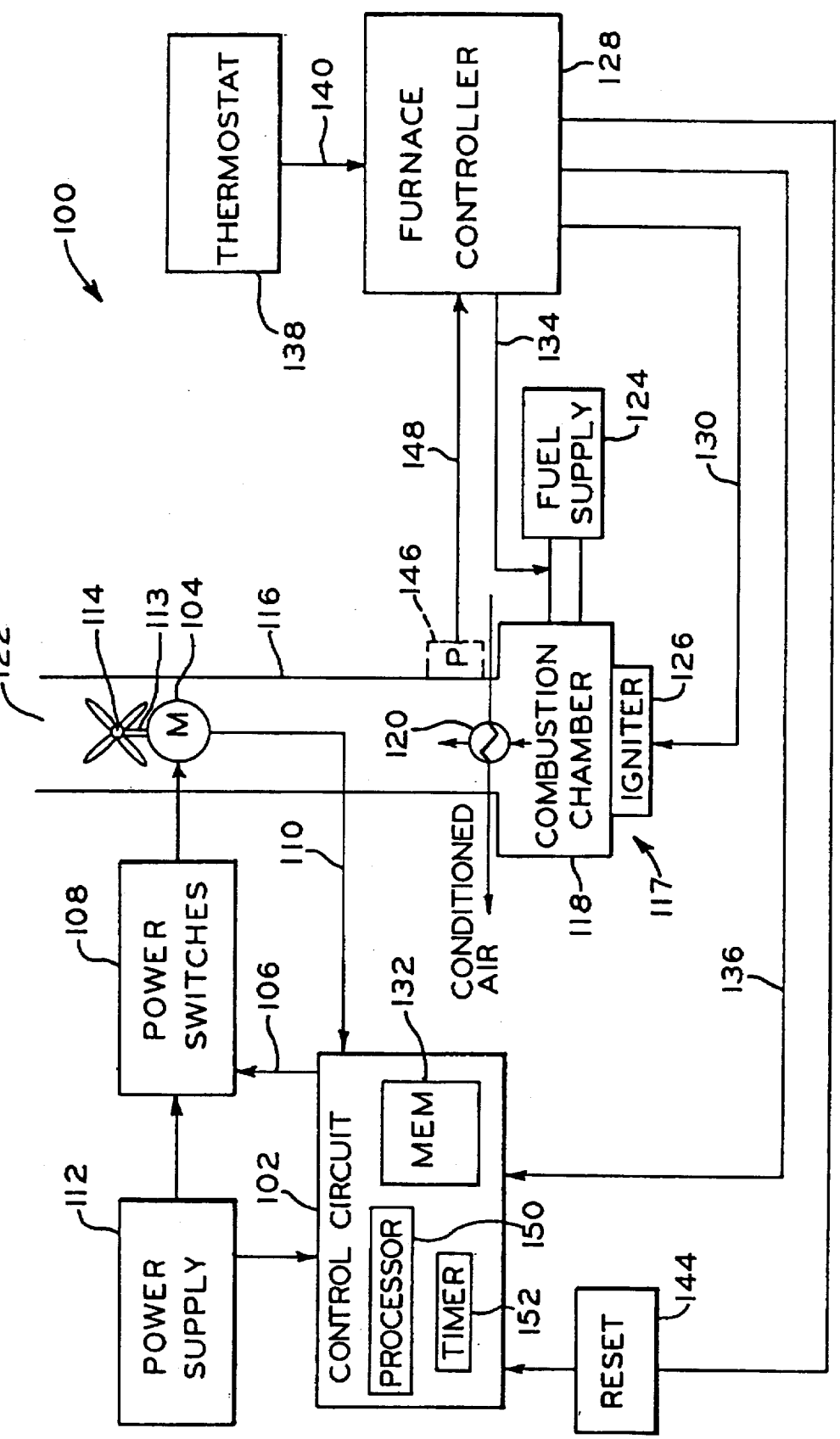

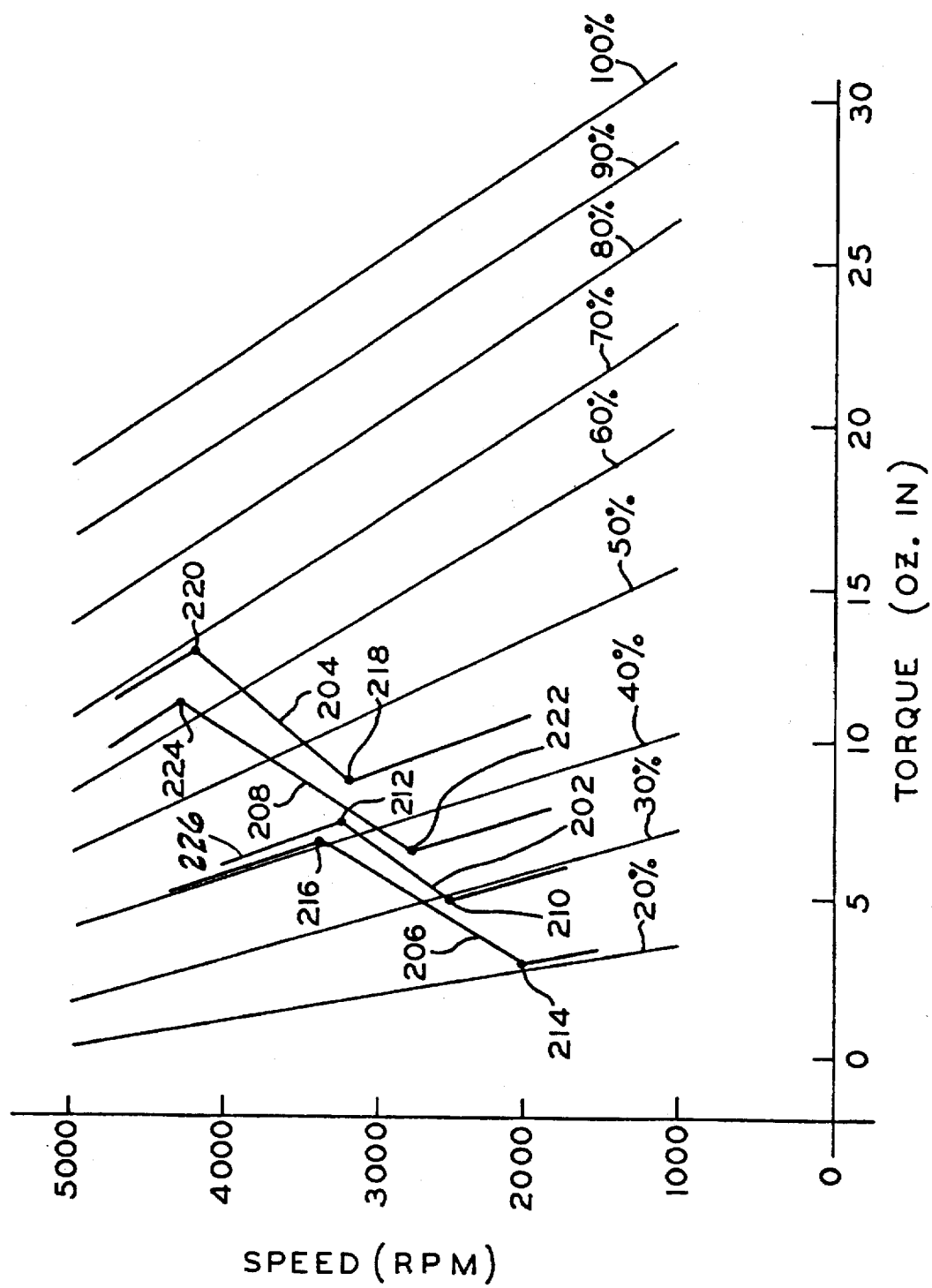

FIG_3A
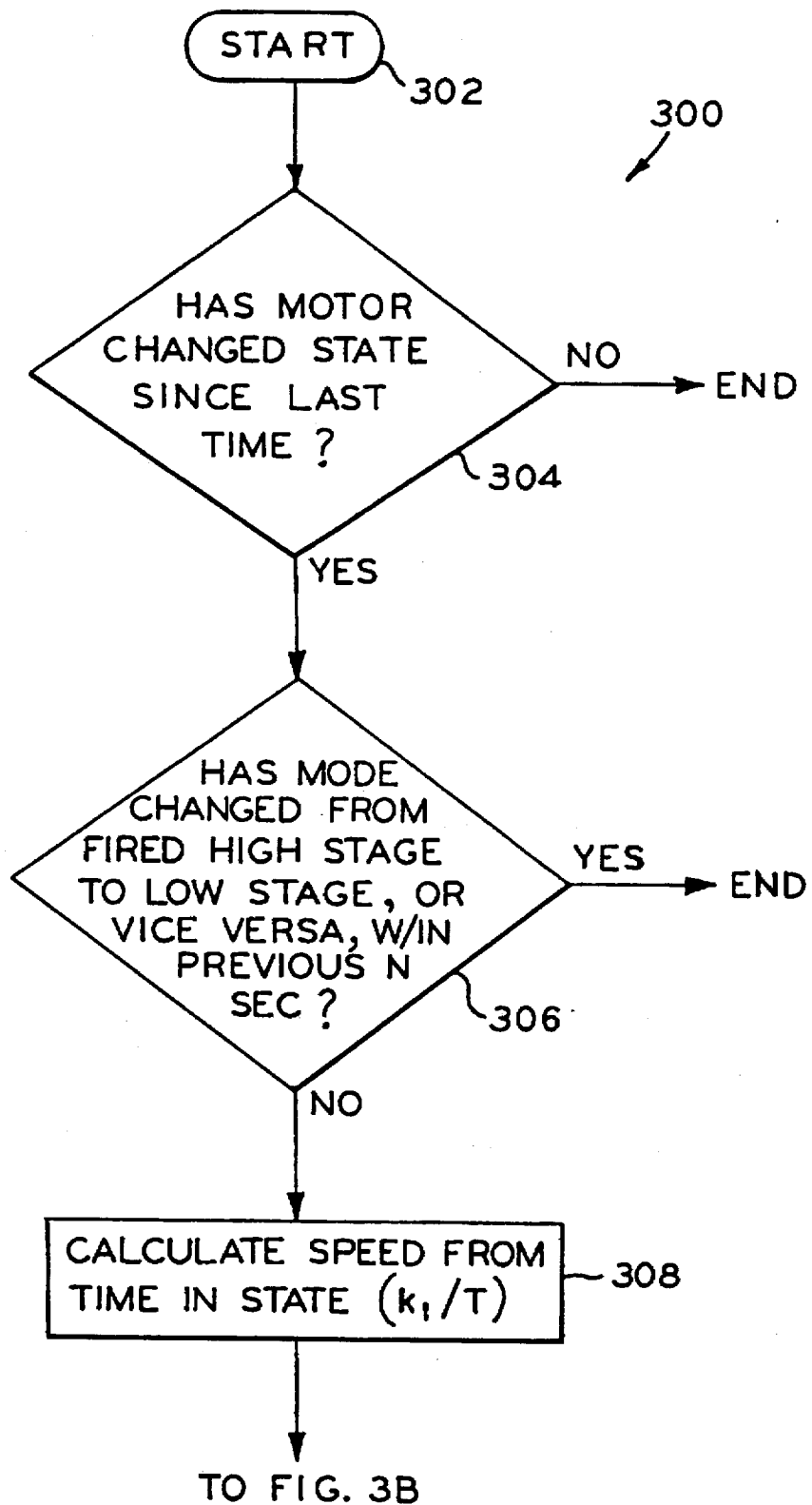

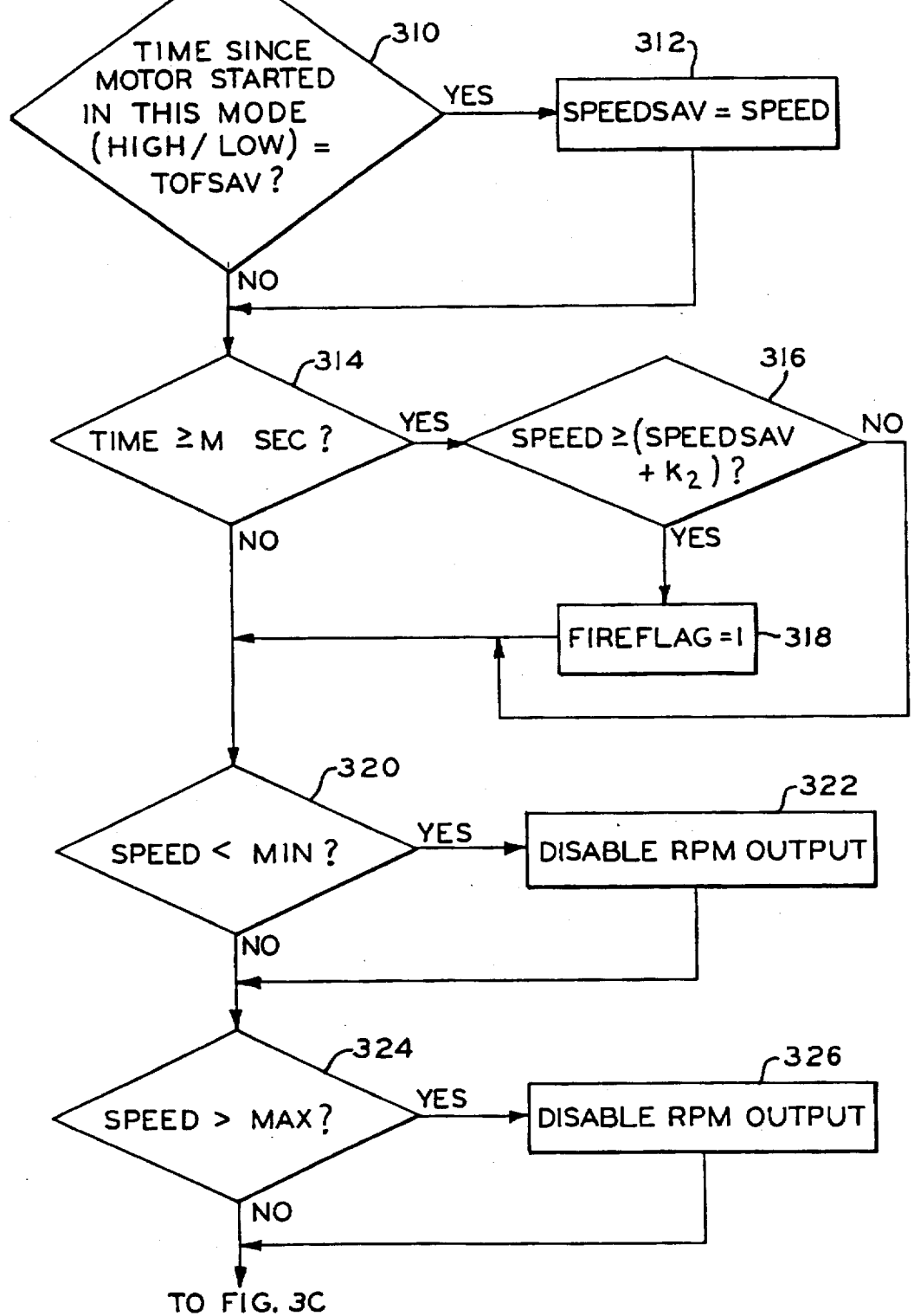
FIG_3B

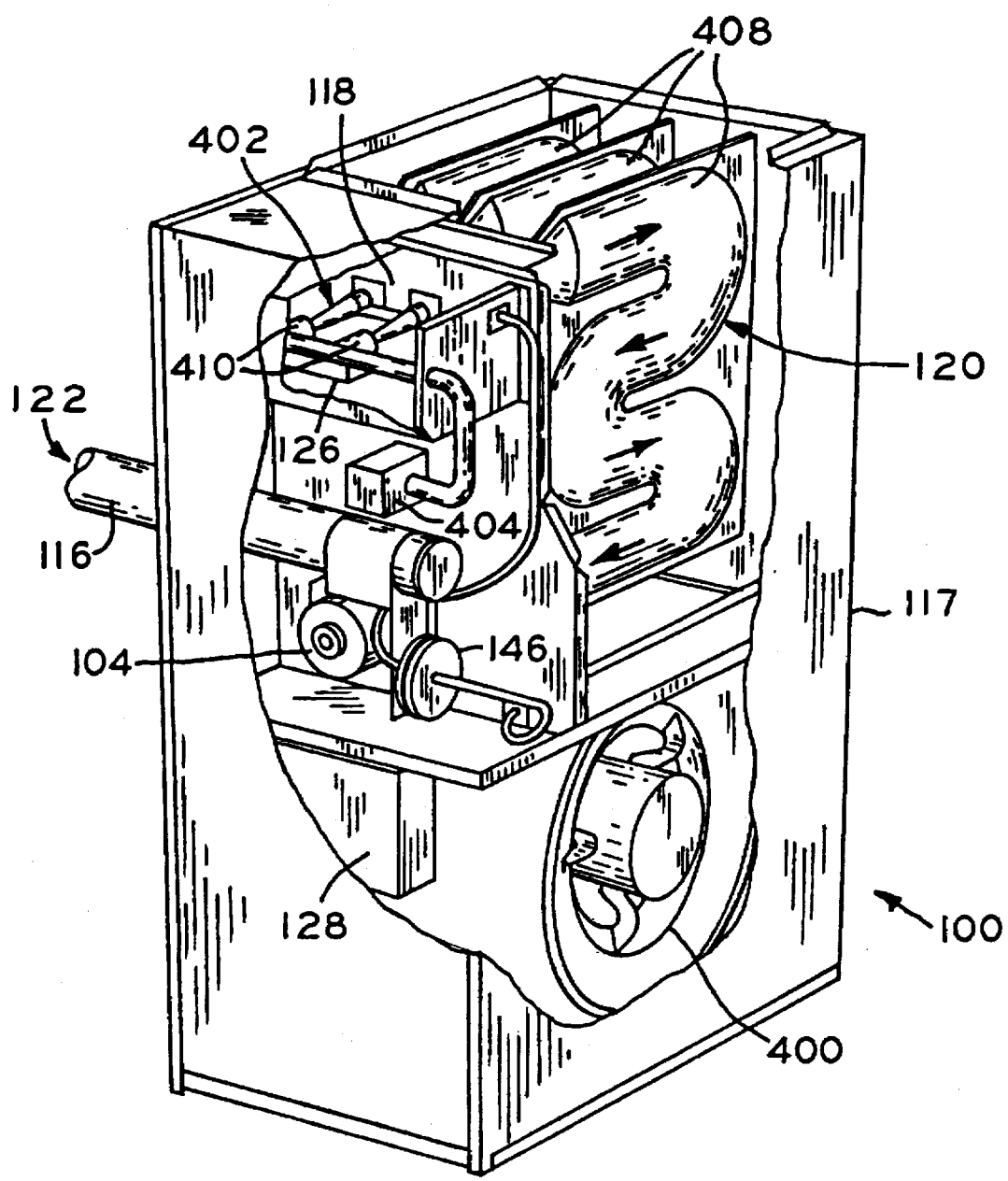
FIG_4

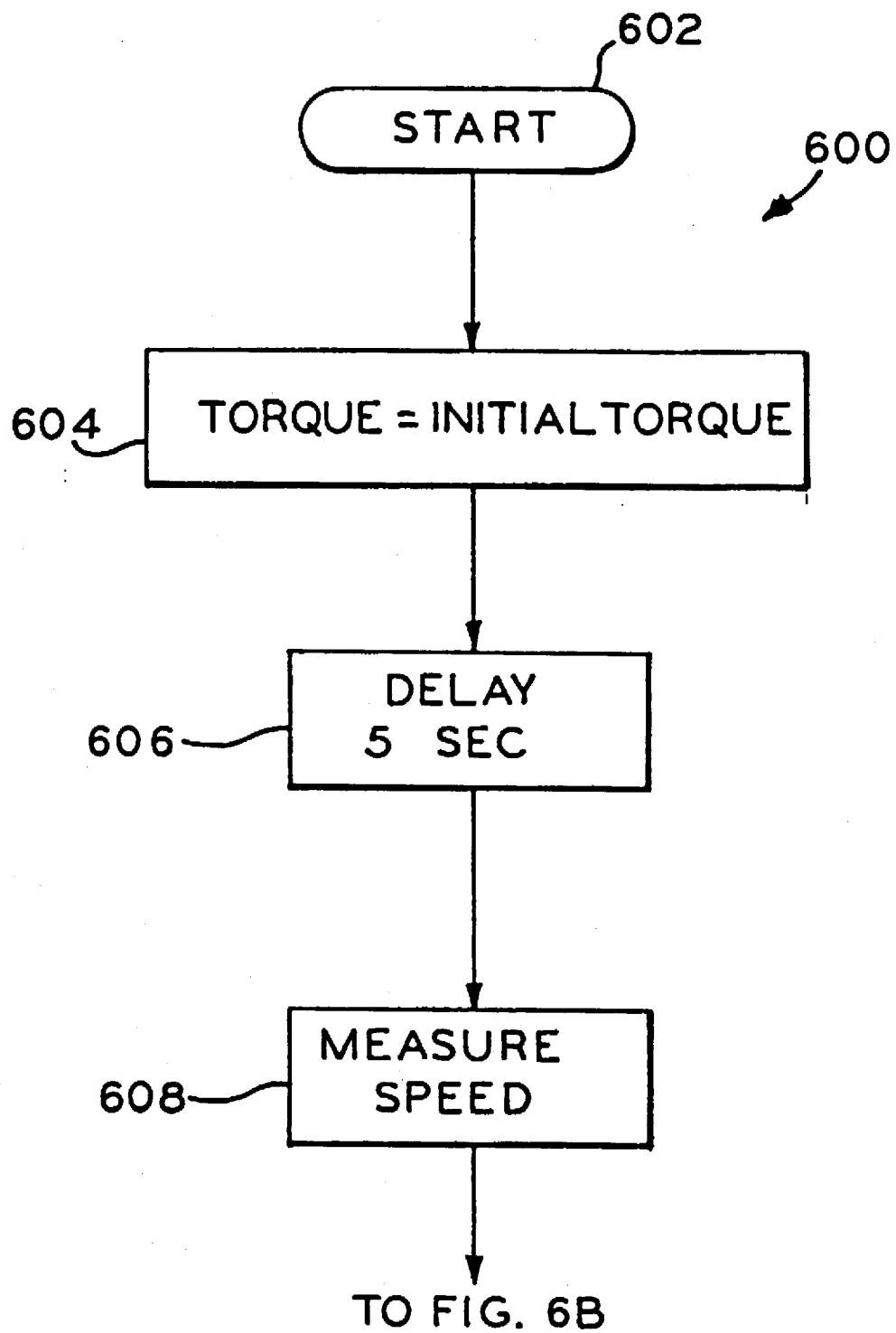

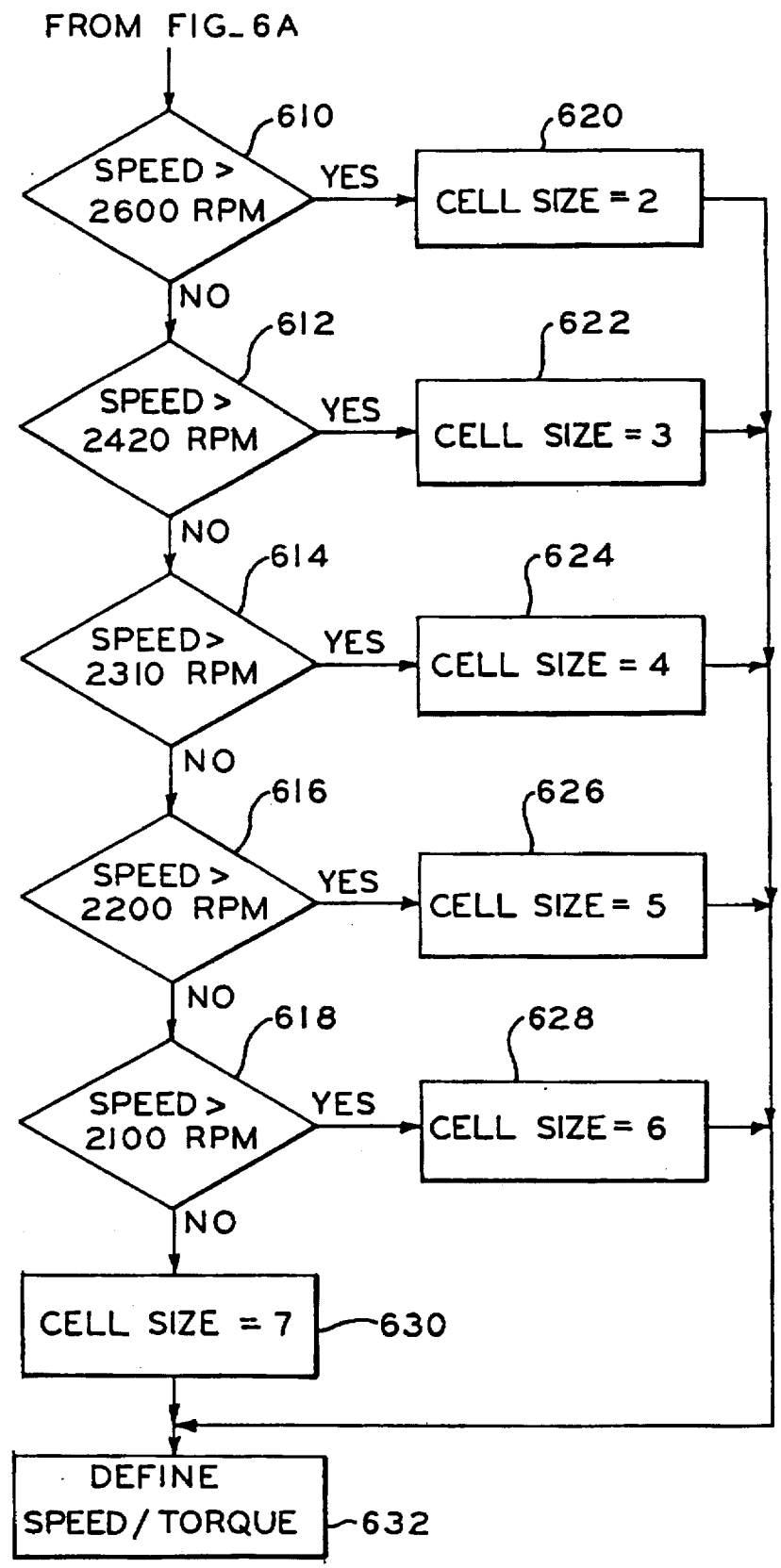
FIG_6B

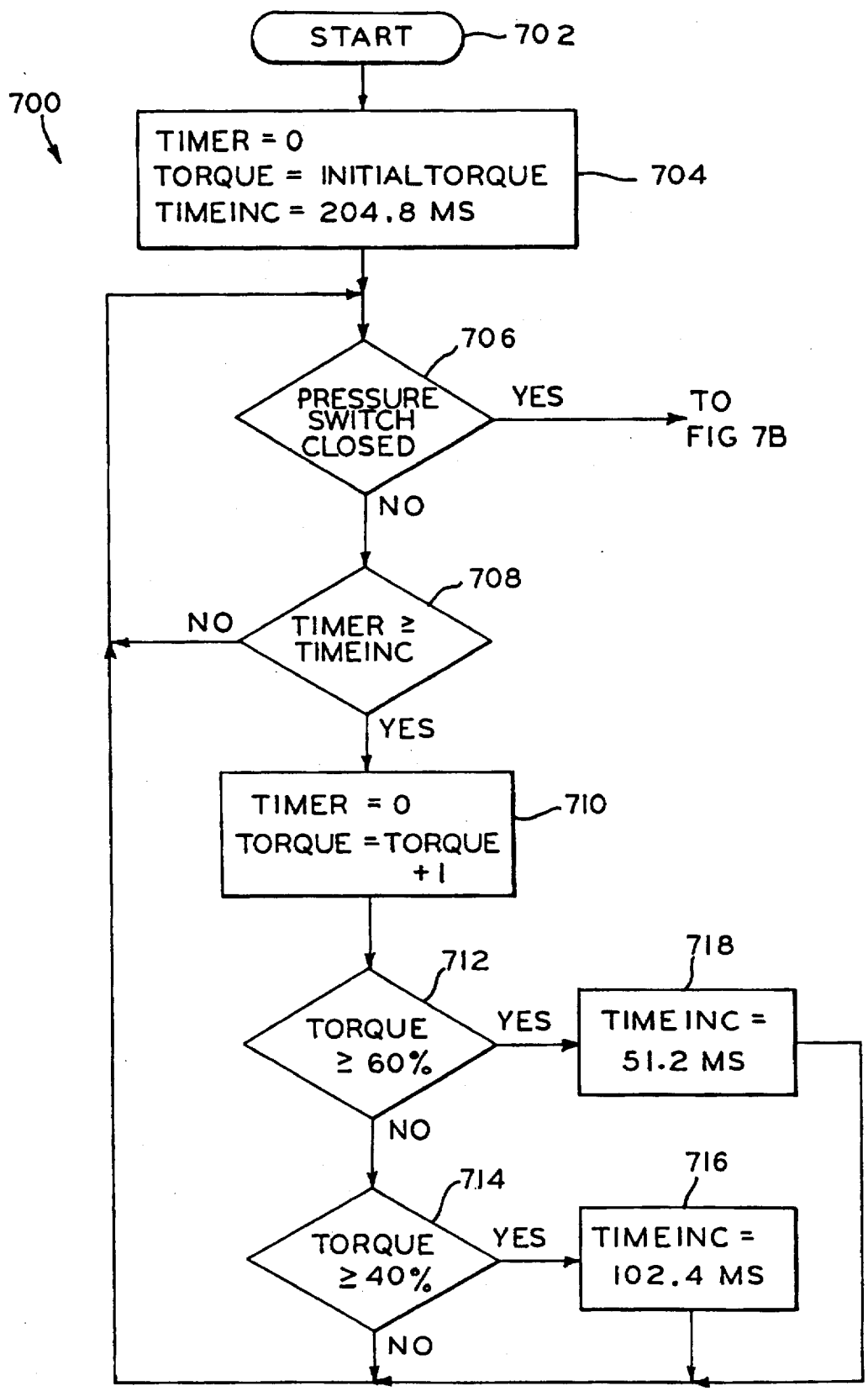
FIG_7A

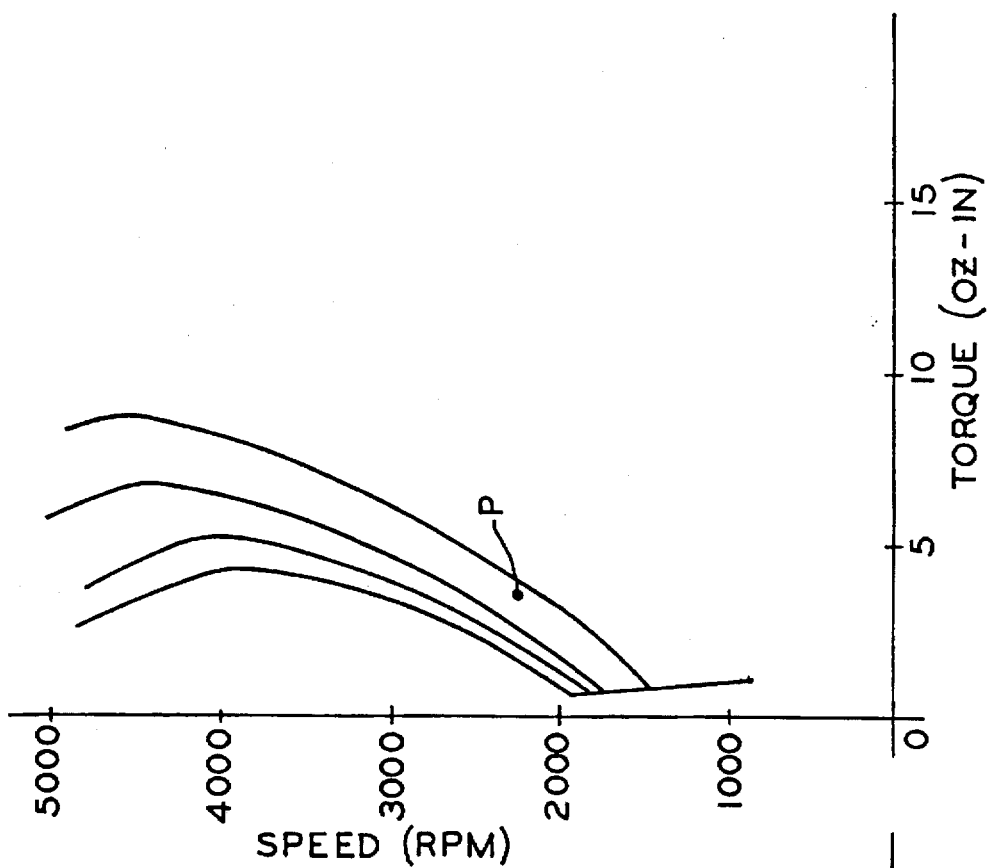
FIG._9D
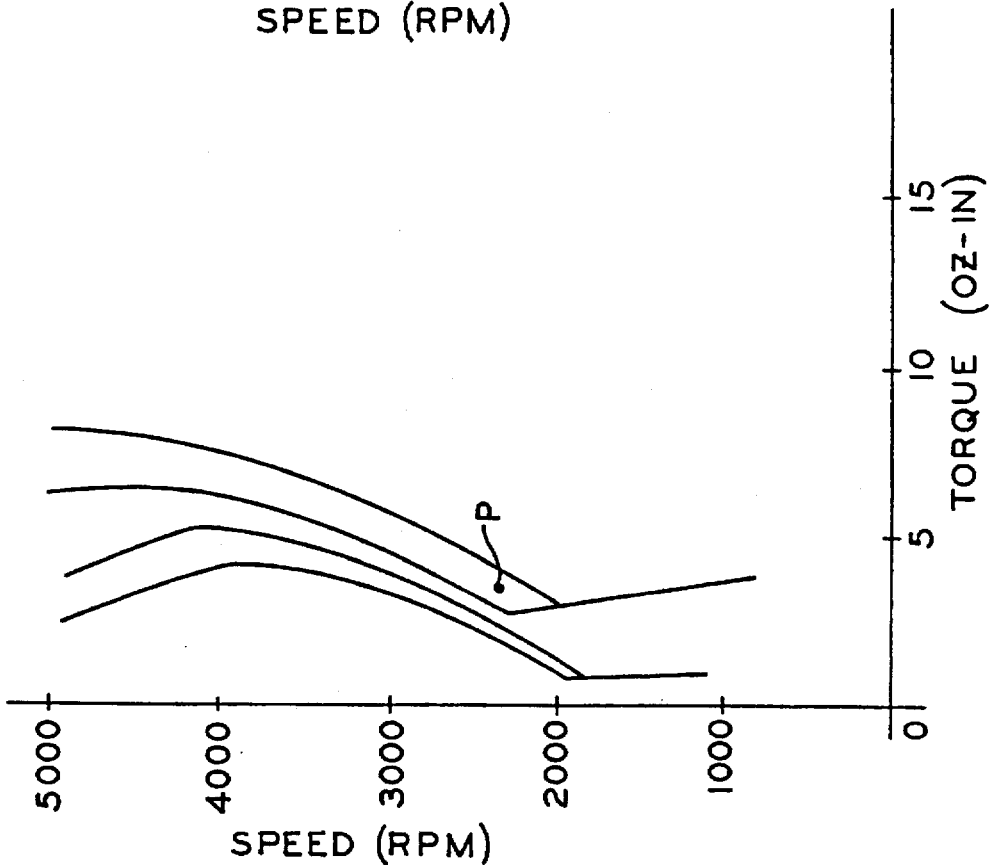
FIG._9C

SYSTEMS AND METHODS FOR CONTROLLING A DRAFT INDUCER FOR A FURNACE

CROSS-REFERENCE TO RELATED APPLICATIONS

This application is a continuation-in-part of: 1) commonly assigned application Ser. No. 08/477,374 filed Jun. 7, 1995 which application Ser. No. 08/477,374 is a continuation-in-part of: a) commonly assigned application Ser. No. 08/299,528 filed Sep. 1, 1994 now U.S. Pat. No. 5,557,182 which application Ser. No. 08/299,528 is a continuation-in-part of commonly assigned application Ser. No. 08/025,371 filed Feb. 26, 1993 (issued as U.S. Pat. No. 5,418,438 on May 23, 1995); b) commonly assigned application Ser. No. 08/402,998 filed Mar. 9, 1995 now U.S. Pat. No. 5,616,995 which application Ser. No. 08/402,998 is a continuation-in-part of application Ser. No. 08/025,371; application Ser. No. 08/299,528; commonly assigned application Ser. No. 08/352,393 filed Dec. 8, 1994 (pending) which application Ser. No. 08/352,393 is a continuation of commonly assigned application Ser. No. 08/023,790 filed Feb. 22, 1993 (abandoned); and commonly assigned application Ser. No. 08/397,686 filed Mar. 1, 1995 (abandoned) which application Ser. No. 08/397,686 is a continuation-in-part of application Ser. No. 08/025,371; application Ser. No. 08/299,528; and application Ser. No. 08/352,393; and c) commonly assigned application Ser. No. 08/431,063 filed Apr. 28, 1995 (pending) which application Ser. No. 08/431,063 is a continuation-in-part of application Ser. No. 08/025,371; application Ser. No. 08/299,528; application Ser. No. 08/397,686; and application Ser. No. 08/402,998; 2) application Ser. No. 08/431,063; 3) application Ser. No. 08/402,998; and 4) application Ser. No. 08/299,528; the entire disclosures of which are incorporated herein by reference.

NOTICE

Copyright ©1995 General Electric Company. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention generally relates to electronically controlled motors and, in particular, to a draft inducer system providing improved control for a motor driving a fan for inducing a draft in an exhaust.

In a conventional furnace, natural convection currents move air through the exhaust outlet of the furnace's combustion chamber to carry away exhaust gases. The moving air further induces a draft in the combustion chamber for mixing oxygen with the fuel being burned in the chamber. Heat energy remaining in the exhaust gases, however, is lost to the atmosphere which decreases the overall efficiency of the furnace. The use of heat exchangers improves furnace efficiency by extracting additional heat from the exhaust gases before they are vented to the atmosphere. Extracting heat from the exhaust gases, however, reduces the natural convection currents which would otherwise carry the gases away. One solution has been to use a draft inducing fan to force the exhaust gases into the atmosphere.

Commonly assigned U.S. Pat. No. 5,075,608 and application Ser. No. 08/025,371, the entire disclosures of which are incorporated herein by reference, provide improvements in draft inducer systems which beneficially increase furnace efficiency. Such improvements allow controlling fan speed as a function of the pressure sensed by a pressure transducer. Further improvements provided by application Ser. No. 08/299,528, the entire disclosure of which is incorporated herein by reference, minimize the risk of overheating the electronic control of a draft inducer system by maintaining motor operation within a desired speed/torque area such that the temperature of the electronic control does not exceed the level that may cause the electronic control to fail.

Applications Ser. Nos. 08/402,998 and 08/397,686, the entire disclosures of which are incorporated herein by reference, provide further improvements in draft inducer systems for maintaining pressure across the furnace's heat exchanger assembly at a desired level without the use of a pressure transducer for controlling motor speed. These applications further provide improvements in sensing ignition in the combustion chamber since combustion decreases the density of the combustion chamber gases moved by the draft inducer fan which can affect motor speed/torque.

While such systems represent improvements, further improvements in draft inducer control systems, draft inducer apparatus and methods of control and operation are needed to economically and efficiently accommodate furnaces having different restrictions to air flow which affects draft inducer performance. Generally, furnaces with different capacities will have different restrictions and, thus, will require the draft inducer motor to operate at different speeds and/or torques to produce the desired pressure in the combustion chamber. For this reason, conventional furnaces either use different motors for different capacities or include a device, such as a choke plate, to modify the furnace installation. A choke plate restricts air flow to "simulate" a higher capacity furnace. However, the use of different motors or the modification of the furnace increases both cost and the complexity of installation. Therefore, improvements are needed to beneficially provide motor control which is adaptable to furnaces of differing capacities.

SUMMARY OF THE INVENTION

Among the objects of the invention are to provide an improved motor system and method of control which overcome at least some of the disadvantageous conditions described above; to provide such a motor system and method which permit adaptively controlling motor operation based on the furnace restriction; to provide such a motor system and method which permit determining furnace capacity as a function of furnace restriction; to provide such a motor system and method which permit adaptively controlling motor operation based on the furnace capacity; to provide such a motor system and method which permit maintaining a desired pressure drop across a heat exchanger assembly for extracting heat from the combustion chamber's exhaust; to provide such a motor system and method which permit maintaining a desired air/combustion material mixture; and to provide such a motor system and method which are electrically efficient, reliable, economical and convenient to use.

Briefly described, a draft inducer apparatus embodying aspects of the present invention is for use with a furnace that has a combustion chamber and an exhaust outlet for venting exhaust combustion chamber gases from the furnace. The furnace also has at least one heat exchanger assembly for extracting heat from the exhaust combustion chamber gases and transferring heat to conditioned air. The apparatus is also for use with a fan for inducing a draft in the combustion chamber which causes a pressure drop across the heat exchanger assembly for moving the exhaust combustion chamber gases through the exhaust outlet. The apparatus includes a motor with a shaft for driving the fan in response to a motor control signal and a memory storing information defining a relationship between motor speed, motor torque and parameters defining motor operation. The stored information includes a table of predefined speed/torque values for defining a set of speed/torque curves. According to the invention, a pressure switch provides a pressure signal representative of a reference pressure across the heat exchanger assembly and a control circuit generates the motor control signal to increase the torque of the motor when the pressure signal indicates that the pressure drop is less than the reference pressure. A processor determines the speed and torque of the motor when the pressure drop corresponds to the reference pressure. In response to the determined motor speed and torque, the processor retrieves from the memory a parameter defining at least one delta value corresponding to the determined motor speed and torque. The processor adapts the predefined speed/torque values as a function of the delta value to define the speed/torque curves corresponding to a desired pressure drop across the heat exchanger assembly. The apparatus further includes a control circuit for generating the motor control signal in response to the defined set of speed/torque curves. Thus, the motor will operate as a function of the determined motor speed and motor torque to control the draft induced in the combustion chamber.

In another form, a motor embodying aspects of the present invention is for use with a furnace that has a combustion chamber and an exhaust outlet for venting exhaust combustion chamber gases from the furnace. The furnace also has at least one heat exchanger assembly for extracting heat from the exhaust combustion chamber gases and transferring heat to conditioned air and a pressure switch for providing a pressure signal representative of a reference pressure across the heat exchanger assembly. The apparatus is also for use with a fan for inducing a draft in the combustion chamber which causes a pressure drop across the heat exchanger assembly for moving the exhaust combustion chamber gases through the exhaust outlet. The motor includes a shaft for driving the fan in response to a motor control signal and a memory storing information defining a relationship between motor speed, motor torque and parameters defining motor operation. The stored information includes a table of predefined speed/torque values for defining a set of speed/torque curves. According to the invention, a control circuit generates the motor control signal to increase the torque of the motor when the pressure signal indicates that the pressure drop is less than the reference pressure. A processor determines the speed and torque of the motor when the pressure drop corresponds to the reference pressure. In response to the determined motor speed and torque, the processor retrieves from the memory a parameter defining at least one delta value corresponding to the determined motor speed and torque. The processor adapts the predefined speed/torque values as a function of the delta value to define the speed/torque curves corresponding to a desired pressure drop across the heat exchanger assembly. The motor further includes a control circuit for generating the motor control signal in response to the defined set of speed/torque curves. Thus, the motor will operate as a function of the determined motor speed and motor torque to control the draft induced in the combustion chamber.

Generally, another form of the invention is a method of operating a draft inducer apparatus for use with a furnace that has a combustion chamber and an exhaust outlet for venting exhaust combustion chamber gases from the furnace. The furnace also has at least one heat exchanger assembly for extracting heat from the exhaust combustion chamber gases and transferring heat to conditioned air. The draft inducer apparatus is also for use with a fan for inducing a draft in the combustion chamber which causes a pressure drop across the heat exchanger assembly for moving the exhaust combustion chamber gases through the exhaust outlet. The method includes the steps of driving the fan with a motor in response to a motor control signal and storing information in a memory defining a relationship between motor speed, motor torque and parameters defining motor operation. The stored information includes a table of predefined speed/torque values for defining a set of speed/torque curves. The method also includes providing a pressure signal representative of a reference pressure across the heat exchanger assembly. According to the invention, the method includes the steps of generating the motor control signal in response to the pressure signal to increase the torque of the motor when the pressure signal indicates that the pressure drop across the heat exchanger assembly is less than the reference pressure and determining the speed and torque of the motor when the pressure drop corresponds to the reference pressure. The method further includes retrieving from the memory a retrieved parameter defining at least one delta value corresponding to the determined motor speed and motor torque, adapting the predefined speed/torque values as a function of the delta value thereby to define the speed/torque curves corresponding to the desired pressure drop across the heat exchanger assembly and generating the motor control signal in response to the defined set of speed/torque curves. Thus, the motor will operate as a function of the determined motor speed and motor torque to control the draft induced in the combustion chamber.

In yet another form, the invention is a method of operating a motor for use with a furnace that has a combustion chamber and an exhaust outlet for venting exhaust combustion chamber gases from the furnace. The furnace also has at least one heat exchanger assembly for extracting heat from the exhaust combustion cheer gases and transferring heat to conditioned air and a pressure switch for providing a signal representative of a reference pressure across the heat exchanger assembly. The motor is also for use with a fan for inducing a draft in the combustion chamber which causes a pressure drop across the heat exchanger assembly for moving the exhaust combustion chamber gases through the exhaust outlet. The method includes the steps of driving the fan with a shaft of the motor in response to a motor control signal and storing information in a memory defining a relationship between motor speed, motor torque and parameters defining motor operation. The stored information includes a table of predefined speed/torque values for defining a set of speed/torque curves. According to the invention, the method includes the steps of generating the motor control signal in response to the pressure signal to increase the torque of the motor when the pressure signal indicates that the pressure drop across the heat exchanger assembly is less than the reference pressure and determining the speed and torque of the motor when the pressure drop corresponds to the reference pressure. The method further includes retrieving from the memory a retrieved parameter defining at least one delta value corresponding to the determined motor speed and motor torque, adapting the predefined speed/torque values as a function of the delta value thereby to define the speed/torque curves corresponding to the desired pressure drop across the heat exchanger assembly and generating the motor control signal in response to the defined set of speed/torque curves. Thus, the motor will operate as a function of the determined motor speed and motor torque to control the draft induced in the combustion cheer.

Other objects and features will be in part apparent and in part pointed out hereinafter.

BRIEF DESCRIPTION OF THE DRAWINGS

FIG. 1 is a block diagram of a furnace system including a control circuit for a motor according to a preferred embodiment of the invention.

FIG. 2 illustrates exemplary speed vs. torque curves defining four operating states of the system of FIG. 1.

FIGS. 3A, 3B and 3C illustrate a flow diagram of the operation of the control circuit of FIG. 1 according to a preferred embodiment of the invention.

FIG. 4 is a perspective view of a furnace according to a preferred embodiment of the invention with portions cut away.

FIGS. 6A and 6B illustrate a flow diagram of the operation of the control circuit of FIG. 1 according to another preferred embodiment of the invention.

FIGS. 7A and 7B illustrate a flow diagram of the operation of the control circuit of FIG. 1 according to yet another preferred embodiment of the invention.

FIGS. 9A, 9B, 9C, 9D, 9E and 9F illustrate exemplary speed vs. torque curves defining operation of the motor of FIG. 1.

Corresponding reference characters indicate corresponding parts throughout the drawings.

DETAILED DESCRIPTION OF THE PREFERRED EMBODIMENTS

Figure 1A:
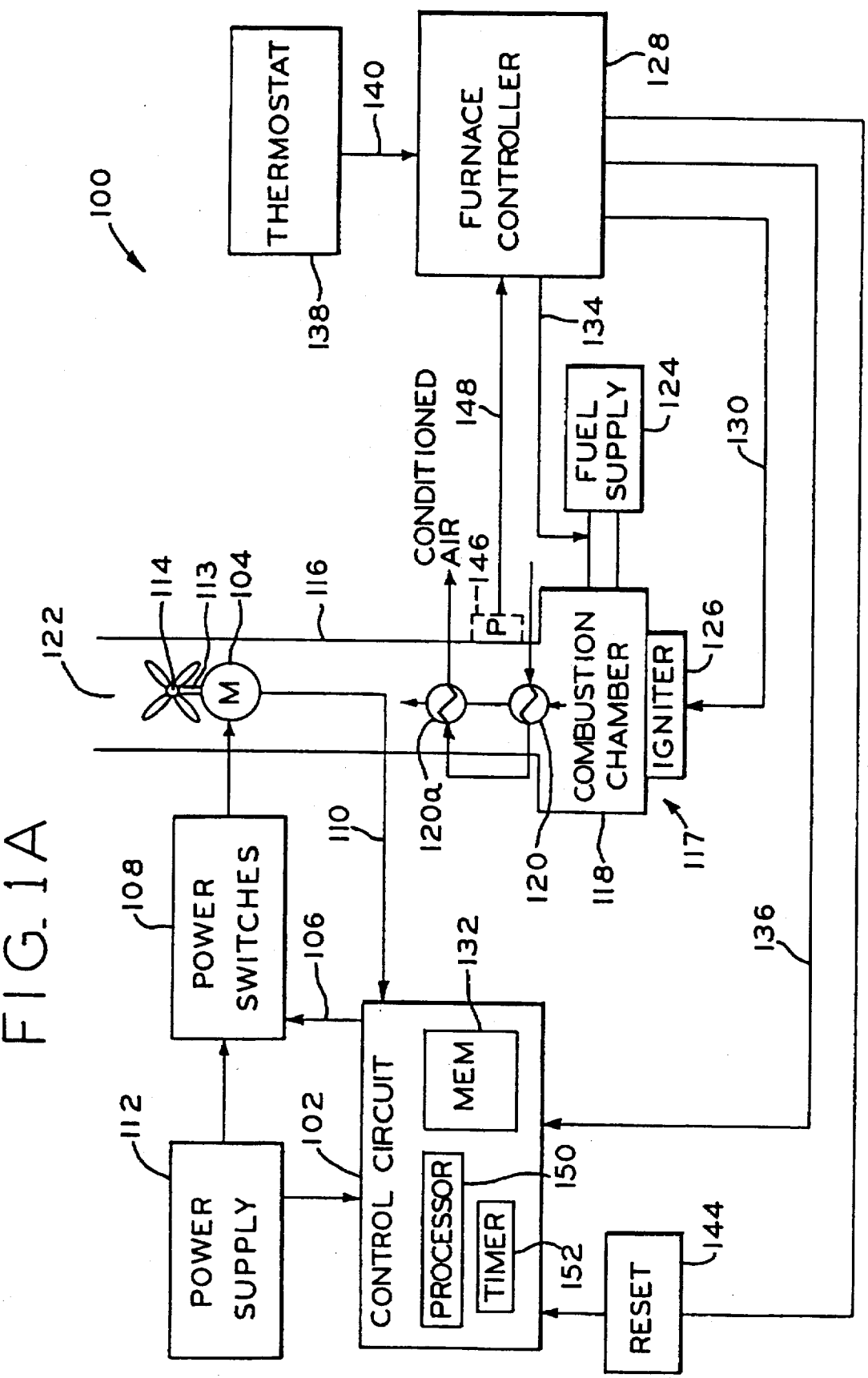
FIG. 1A is a block diagram of a furnace system including a control circuit for a motor according to another preferred embodiment of the invention.

Referring now to FIG. 1, one preferred embodiment of a system 100 is shown, including a control circuit 102 for any electronically controllable motor. Such motors include single and variable speed motors, selectable speed motors having a plurality of finite, discrete speeds and brushless DC motors, including electronically commutated motors and switched reluctance motors. In the illustrated embodiment, the control circuit 102 is connected to a motor 104. The motor 104 is preferably a draft inducer variable speed motor such as the single phase motor described in commonly assigned application Ser. No. 08/352,393, the entire disclosure of which is incorporated herein by reference. Control circuit 102 is preferably mounted within a housing (not shown) of motor 104 and sends control commands to motor 104 via line 106 to a set of power switches 108. Control circuit 102 also receives speed or torque feedback from motor 104 via line 110. In a preferred embodiment, motor 104 has a stationary assembly (not shown) and a rotatable assembly (not shown) in magnetic coupling relation to the stationary assembly. The stationary assembly includes windings adapted to be energized in at least one preselected sequence. The power switches 108, responsive to the control commands at line 106, selectively connect a power supply 112 to the windings of motor 104 to provide current to the windings in the preselected sequence to produce an electromagnetic field for rotating the rotatable assembly. The rotatable assembly of motor 104 is coupled via a shaft 113 to a rotatable component, such as a fan 114, for inducing a draft in an exhaust outlet 116 of a conventional heating, ventilating, and air conditioning system, such as a furnace 117 (portions of which are shown in FIGS. 1 and 4).

According to the invention, the system 100 is for use with the furnace 117 and, in the alternative, system 100 includes furnace 117. Preferably, furnace 117 has a combustion chamber 118 providing combustion gases to which the exhaust outlet 116 is connected for venting exhaust combustion gases from furnace 117. Fan 114, which is positioned within exhaust outlet 116 in one embodiment, induces a draft in the combustion chamber 118 by moving exhaust combustion chamber gases through exhaust outlet 116. As a result of the moving gases, a pressure is established in exhaust outlet 116. In an alternative embodiment, fan 114 is positioned in an inlet (not shown) to combustion chamber 118.

Furnace 117 conditions air for heating a space (not shown) by moving air with a blower (see FIG. 4) across a heat exchanger assembly 120 positioned adjacent combustion cheer 118. In this manner, the conditioned air gains heat before it is discharged to the space by the blower. As described above, natural convection forces cause hot exhaust gases to rise and vent to the atmosphere in a typical furnace. In a preferred embodiment, the heat exchanger assembly 120 also extracts heat from the exhaust combustion chamber gases before they are vented away. Additional pressure, however, is then needed to force the cooled exhaust through exhaust outlet 116 to the atmosphere via an exhaust port 122. Inducing a draft with fan 114 provides the additional pressure. In this manner, fan 114 develops a positive flue pressure which forces furnace exhaust from combustion chamber 118 through heat exchanger assembly 120 (where heat is extracted and transferred to conditioned air provided to the space to be heated) and then forces cooled exhaust to vent via the exhaust port 122 of exhaust outlet 116. As described herein, exhaust combustion chamber gases include products of combustion, fuel gases and/or input air. Thus, when combustion chamber 118 is not ignited, the exhaust combustion chamber gases primarily constitute air being moved through combustion chamber 118 by fan 114.

In another preferred embodiment, shown in FIG. 1A, system 100 includes an additional heat exchanger assembly 120a for extracting heat from the exhaust combustion chamber gases. It is to be understood that the positional relationships between exhaust outlet 116, combustion chamber 118, heat exchanger assembly 120 and/or heat exchanger assembly 120a may vary depending on the particular furnace. Further, the number of heat exchanger assemblies or the number of heat exchanger elements used in the particular furnace may vary as well. In a preferred embodiment, a furnace according to the present invention is of a general type, such as a two-stage condensing furnace. However, a furnace according to the invention could be a single or multiple stage, or variable stage, condensing or non-condensing furnace. For clarity, the present invention will be described with respect to heat exchanger assembly 120 of FIG. 1 where corresponding reference characters throughout FIGS. 1 and 1A indicate corresponding parts.

According to the invention, furnace 117 preferably operates in at least two operating states. In a first, or prefire, operating state, combustion does not occur in combustion chamber 118. In a second, or post-fire, operating state, however, a fuel supply 124 provides a combustible material (i.e., a fuel such as natural gas or oil) to combustion chamber 118. An igniter 126, activated by a furnace controller 128 via line 130, ignites the combustible fuel within chamber 118. In the second operating state, combustion occurs in combustion chamber 118. In another preferred embodiment of the invention, the furnace controller 128 is part of control circuit 102 which provides control not only for motor 104 but also for furnace 117.

As a general rule, the density of the combustion chamber gases flowing through or across heat exchanger assembly 120 and fan 114 is greater in the first operating state, without combustion, than in the second operating state, with combustion. As a result, the speed of fan 114 increases when furnace 117 changes from the first operating state to the second operating state. Similarly, in a system operating such that speed remains constant, motor torque will decrease as the density of the combustion chamber gases flowing across fan 114 decreases.

The speed of fan 114 as driven by motor 104 regulates the flow of combustion chamber gases in system 100. In systems where combustion by-products need to be controlled, it is important to achieve the proper amount of input air mixed with fuel so that an optimum air-fuel mixture is constantly being burned in combustion chamber 118. To achieve the proper air-fuel mixture, combustion products must be exhausted at an appropriate rate.

As described above, the density of combustion chamber gases flowing across heat exchanger assembly 120 is greater when furnace 117 is operating in its first operating state rather than in its second operating state. According to the invention, the control commands on line 106 take the form of a motor control signal. Motor 104 drives fan 114 in response to an appropriate motor control signal at a motor speed which is a function of the density of the combustion chamber gases flowing across heat exchanger assembly 120. As such, different motor speeds result as a function of the density of the combustion chamber gases flowing across fan 114. In turn, fan 114 moves the combustion cheer gases through exhaust outlet 116 thereby inducing a draft in combustion chamber 118 that causes a pressure drop across heat exchanger assembly 120.

A speed circuit, preferably resident in control circuit 102, provides a speed signal representative of the speed of motor 104 in response to the speed/torque feedback via line 110. In the alternative, the speed signal could be provided by a speed sensor external to the housing of motor 104. U.S. Pat. No. 5,075,608 discloses a draft inducer control system which controls fan speed in response to the pressure measured by a pressure transducer located between the fan and combustion chamber. Advantageously, system 100 accomplishes speed regulation to maintain a desired pressure across heat exchanger assembly 120 as a function of predefined speed/torque curves rather than by using a pressure sensor. Thus, the need for a pressure sensor for regulating motor speed is eliminated.

Control circuit 102 generates motor control signals in response to the speed signal as a function of either a first set of speed/torque curves or a second set of speed/torque curves. Prior to operating system 100, the speed/torque curves are developed by running a sample furnace under varying conditions. For example, a motor similar to motor 104 drives a fan similar to fan 114 for moving combustion chamber gases at a given density and at a given fuel flow to the sample furnace's combustion chamber. An operator varies the duty cycle of current energizing the motor's windings until a desired pressure drop across heat exchanger assembly 120 is reached in the sample furnace and then measures motor speed. By varying the restrictions to air flow in the sample furnace, a number of samples can be taken for developing speed/torque curves. For example, a speed/torque curve is developed by performing a three-piece linear fit of four samples taken at various air restrictions. As a specific example, for a pressure of 1.8 inches, a current value of 90 (where 0 corresponds to 0% duty cycle and 255 corresponds to 100% duty cycle) yields a minimum speed of 2100 at a minimum air restriction; and a current value of 160 yields a maximum speed of 4300 rpm at a maximum acceptable air restriction. Two intermediate points are obtained with a current value of 110 and a speed of 2700 rpm and with a current value of 130 and a speed of 3400 rpm. The duty cycle is a convenient means for generating speed/torque curves during testing of motor 104. Further, by changing the air restrictions, the operator simulates various lengths of piping connected to furnace 117. Also, the maximum air restriction is selected as a function of noise, the maximum motor speed and the like. The process is then repeated for low density combustion chamber gases, that is, with combustion in the sample furnace's combustion chamber. Similarly, speed/torque curves are developed for different fuel flows requiring different pressures, that is, low and high stage furnace operation. The operator can further modify the curves by varying the advance angles and off times of the current energizing the motor's windings to achieve desired performance.

In one preferred embodiment, control circuit 102 includes a memory 132 for storing the first and second sets of speed/torque curves as a table of predefined speed/torque values corresponding to desired operation of furnace 117 under varying conditions, including various restrictions to air flow. Thus, the memory 132 defines the first and second sets of speed/torque curves corresponding to a desired pressure drop across heat exchanger assembly 120.

As described above, control circuit 102 generates motor control signals in response to the speed signal as a function of either the first or second set of speed/torque curves. According to a preferred embodiment of the invention, control circuit 102 generates the motor control signal as a function of the first set of speed/torque curves until the speed signal indicates that the speed of motor 104 has reached a reference speed. After the speed signal indicates that the speed of motor 104 has reached the reference speed, control circuit 102 generates the motor control signal as a function of the second set of speed/torque curves. In this manner, motor 104 will operate in accordance with one or more of the first speed/torque curves when furnace 117 is in the first operating state and in accordance with one or more of the second speed/torque curves when furnace 117 is in the second operating state.

In addition to storing the first and second sets of speed/torque curves, memory 132 preferably stores the speed of motor 104 as represented by the speed signal a reference period of time after motor 104 first begins driving fan 114. A circuit resident in control circuit 102 compares the stored speed to the motor speed as subsequently represented by the speed signal. In this manner, control circuit 102 detects a change from the first operating state to the second operating state when the difference between the compared speeds exceeds a predetermined amount. A change in the density of the combustion chamber gases flowing across heat exchanger assembly 120 causes this speed difference. As such, control circuit 102 provides adaptive control.

The furnace system of the invention includes furnace controller 128 which provides a furnace operating signal for causing furnace 117 to operate in either a low stage or a high stage of the first and second operating states. The low stage corresponds to a low desired flow of fuel to combustion chamber 118 and to a low desired pressure drop across heat exchanger assembly 120. Likewise, the high stage corresponds to a high desired flow of fuel to combustion chamber 118 greater than the low desired flow and to a high desired pressure drop across heat exchanger assembly 120 greater than the low desired pressure drop. As an example, the low delta pressure may be 1.05 inches and the high delta pressure may be 2.2 inches for heat exchanger assembly 120. Furnace controller 128 communicates the desired low or high stage to the fuel supply 124 via line 134 for varying the amount of fuel supplied to combustion chamber 118.

The first and second sets of speed/torque curves each include a speed/torque curve corresponding to the low stage and a speed/torque curve corresponding to the high stage. Thus, in a preferred embodiment of the invention, memory 132 stores a pre-fire low stage speed/torque curve and a pre-fire high stage speed/torque curve in addition to a post-fire low stage speed/torque curve and a post-fire high stage speed/torque curve. Control circuit 102 generates the appropriate motor control signal in response to the furnace operating signal as a function of the pre-fire low stage speed/torque curve in the low stage of the first operating state and as a function of the pre-fire high stage speed/torque curve in the high stage of the first operating state. Likewise, control circuit 102 further generates the motor control signal as a function of the post-fire low stage speed/torque curve in the low stage of the second operating state and as a function of the post-fire high stage speed/torque curve in the high stage of the second operating state.

Furnace controller 128 also communicates the desired low or high stage to control circuit 102 via line 136. When changing in-state from the low stage to the high stage, control circuit 102 generates a motor control signal independent of the speed/torque curves. For example, if furnace 117 is operating in the low stage of the second operating state, the independent motor control signal adds a current value of 80 to the present low stage current value for a period of time, such as 1.5 seconds. This causes motor 104 to rapidly increase its speed before control circuit 102 generates the motor control signal as a function of the post-fire high stage speed/torque curve. Similarly, when changing in-state from the high stage to the low stage, control circuit 102 also generates a motor control signal independent of the speed/torque curves. For example, if furnace 117 is operating in the high stage of the second operating state, the independent motor control signal subtracts a current value of 40 from the present high stage current value for a period of time, such as 1.5 seconds. This causes motor 104 to rapidly decrease its speed before control circuit 102 generates the motor control signal as a function of the post-fire low stage speed/torque curve.

According to the invention, furnace 117 discharges heated conditioned air to the space in response to a thermostatic control 138. The thermostatic control 138 preferably provides a two state thermostat signal via line 140 to furnace controller 128 as a function of the temperature of the air in the space. Furnace controller 128 begins operation of furnace 117 in the first operating state in response to a DEMAND state of the thermostat signal. Conversely, furnace controller 128 ends operation of furnace 117 in the second operating state in response to a NO DEMAND state of the thermostat signal. Furnace controller 128 communicates the state of thermostatic control 138 via line 142. In response to the NO DEMAND state, control circuit 102 generates a motor control signal for causing motor 104 to drive fan 114 for a predetermined period of time, such as 15 seconds, after furnace 117 ends operation in the second operating state. In this manner, fan 114 clears combustion chamber gases, including unburned fuel and remaining exhaust, from exhaust outlet 116. It is to be understood that the DEMAND state of the thermostat control signal can correspond to the low stage or high stage or an intermediate stage depending on the particular operating parameters of furnace 117 and the temperature in the space.

In a preferred embodiment, a reset circuit 144, alternatively embodied resident in control circuit 102, is responsive to the NO DEMAND state to reset control circuit 102 after furnace 117 ends operation in the second operating state.

Furnace 117 further includes a fuel control resident in furnace controller 128 for providing a fuel signal which represents whether fuel supply 124 is supplying fuel to combustion chamber 118. In an alternative embodiment, memory 132 is responsive to the fuel signal via line 136 for storing the speed of motor 104 as represented by the speed signal when the fuel signal indicates that fuel supply 124 is not supplying fuel to combustion chamber 118. Control circuit 102 then compares the stored speed to the motor speed when the fuel signal indicates that fuel is being supplied to combustion chamber 118.

In another alternative embodiment of the invention, system 100 includes a pressure switch 146, shown in phantom in FIG. 1. The pressure switch 146, preferably located within exhaust outlet 116 between fan 114 and combustion chamber 118, functions as a backup for system 100. As an example, if the pressure in exhaust outlet 116 falls below a particular level, the risk of a backdraft or a buildup of exhaust gases increases. Pressure switch 146 preferably detects when the pressure drop across heat exchanger assembly 120 has fallen below an acceptable minimum pressure. If so, furnace 117 is instructed via line 148 to shut off the flow of fuel to combustion chamber 118. Thus, pressure switch 146 functions as a backup feature by disabling furnace 117 when the pressure drop across heat exchanger assembly 120 becomes low. In yet another alternative embodiment, pressure switch 146 communicates a pressure signal representative of the minimum pressure across heat exchanger assembly 120 directly to control circuit 102.

FIG. 2 illustrates exemplary speed vs. torque curves for motor 104 driving draft inducer fan 114. Control circuit 102 preferably controls powers switches 108 in accordance with the motor control signal which represents a desired current signal based on the speed/torque curves. In effect, the desired current signal corresponds to a desired torque signal because the torque of the motor is related to the motor current as shown in FIG. 2. The control commands at line 106 are a function of the desired current signal and cause power switches 108 to selectively energize the windings of motor 104.

In a preferred embodiment, the desired current signal is a mapping of current values corresponding to a duty cycle input to motor 104. The duty cycle is a convenient means for generating speed/torque curves during testing of motor 104. FIG. 2 illustrates the speed/torque curves associated with duty cycles of 20%, 30%, 40%, 50%, 60%, 70%, 80%, 90% and 100%.

In this embodiment of the invention, each curve is representative of the torque produced by motor 104 when its windings are energized by a substantially constant current with respect to speed. As shown by these curves, the windings of motor 104 in this embodiment of the invention have a relatively high inductance and less torque is produced in response to a particular current demand at high speeds than at low speeds. For clarity, the speed/torque curves of FIG. 2 are illustrated as smooth lines. However, the actual speed/torque response illustrated by these curves include variations caused by switching noise and the like. Further, it is to be understood that the curves may vary for applications other than those specifically disclosed herein.

According to the invention, operation of motor 104 is controlled according to one of first speed/torque operating curves 202 and 204 or one of second speed/torque operating curves 206 and 208. As shown, the curve 202 corresponds to pre-fire low stage operation and the curve 204 corresponds to pre-fire high stage operation. Likewise, the curve 206 corresponds to post-fire low stage operation and the curve 208 corresponds to post-fire high stage operation. Generally, each of curves 202, 204, 206 and 208 represent operation resulting in a relatively constant desired pressure drop across heat exchanger assembly 120. However, it is to be understood that for certain applications of the invention, the desired pressure may be, for example, slightly greater at lower motor speeds. Further, each of curves 202, 204, 206 and 208 are merely exemplary and are to be used for a particular furnace.

In operation of system 100, thermostatic control 138 provides the DEMAND signal requesting heating in the space. In response, furnace controller 128 selects either high stage or low stage operation. Control circuit 102 generates the appropriate motor control signals for beginning operation of motor 104 according to either curve 202 or 204 as determined by furnace controller 128. For clarity, low stage operation will be described first.

Control circuit 102 generates the motor control signal to begin operation of motor 104 at the minimum desired speed for pre-fire low stage operation, as shown at point 210 on curve 202. Control circuit 102 operates according to an algorithm embodied in flow diagram form in FIGS. 3A–3C. Motor 104 seeks a steady state speed on curve 202 according to the air restriction in furnace 117 of system 100 between point 210 and the maximum desired speed for pre-fire low stage operation, as shown at point 212 on curve 202. After a predetermined period of time, such as 21 seconds, the steady state speed of motor 104, as represented by the speed signal, is stored in memory 132 of control circuit 102. After 40 seconds, for example, system 100 continuously monitors motor speed.

Furnace controller 128 then commands fuel supply 124 via line 134 to supply combustion cheer 118 with fuel according to the desired low stage fuel flow. By operating motor 104 according to curve 202, system 100 maintains the pressure drop across heat exchanger assembly 120 at a desired level and, thus, provides a desired air-fuel mixture in combustion cheer 118. Furnace controller 128 also activates igniter 126 via line 130 so that the air-fuel mixture burns. As the combustion cheer gases flowing across heat exchanger assembly 120 heat up, the density decreases resulting in a relatively sudden increase in the speed of fan 114. By monitoring the speed of motor 104 and comparing the present speed to the speed stored in memory 132, control circuit 102 detects fire in combustion chamber 118 when the present speed exceeds the stored speed by a predetermined amount, such as 275 rpm. As a result of the sudden increase in speed, the pressure across heat exchanger assembly 120 also increases momentarily until control circuit 102 switches its operation to post-fire low stage curve 206. Motor 104 then seeks a steady state speed on curve 206 according to the air restriction in furnace 117 of system 100 between the minimum desired speed for post-fire low stage operation, as shown at point 214 on curve 206, and the maximum desired speed for post-fire low stage operation, as shown at point 216 on curve 206.

As shown in FIG. 2, points 218 and 220 indicate the minimum and maximum, respectively, desired speeds for pre-fire high stage operation of furnace 117. Likewise, points 222 and 224 indicate the minimum and maximum, respectively, desired speeds for post-fire high stage operation of furnace 117.

Figure 3C:
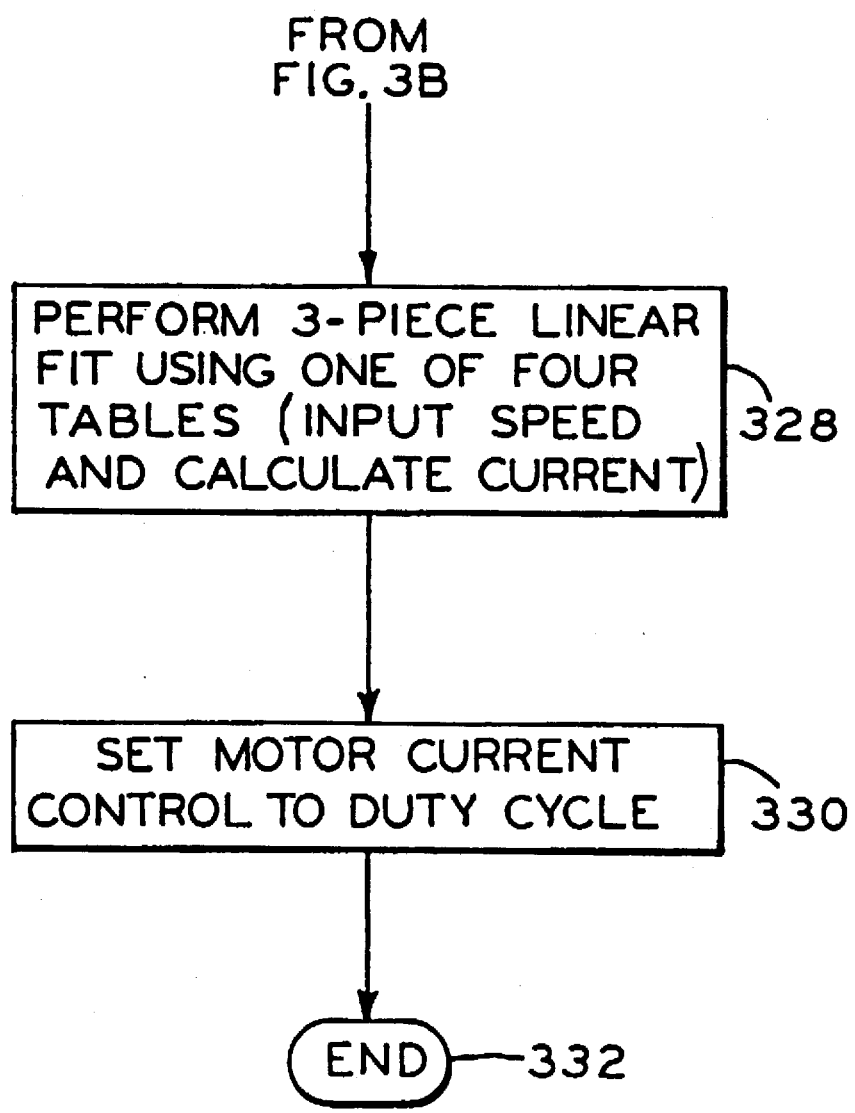

FIGS. 3A, 3B and 3C illustrate the operation of system 100 in the form of a flow diagram 300. In a preferred embodiment of the invention, control circuit 102 includes a processor 150 (see FIG. 1) for performing the operations illustrated by the flow diagram 300.

After beginning at step 302, control circuit 102 determines at step 304 whether motor 104 has changed state since the last time the processor 150 performed the steps of flow diagram 300. In this instance, the term "state" refers to a commutation of the windings of motor 104. For a single phase motor, a "state" corresponds to 180 electrical degrees. If motor 104 has not changed state, then flow diagram 300 ends. If, however, motor 104 has changed state, control circuit 102 proceeds to step 306. At step 306, control circuit 102 determines whether the mode of furnace 117 has changed within a period to time, n. In other words, control circuit 102 determines whether furnace 117 changed from the low stage to the high stage, or vice versa, of the second operating state during the previous n seconds. As an example, n =1.5 seconds. If the mode of furnace 117 has changed, flow diagram 300 ends. On the other hand, if the furnace mode has not changed, control circuit 102 calculates the speed of motor 104 at step 308 as a function of the time it takes for the rotatable assembly of motor 104 to complete a revolution. This is accomplished by dividing a constant $k_1$ by the time motor 104 spent in the commutation state.

Control circuit 102 then proceeds to step 310 for comparing the time motor 104 has been operating in the particular furnace mode (high stage or low stage) to a predetermined period of time, TOFSAV. The time period TOFSAV is preferably set for a particular furnace controller 128 and corresponds to the time necessary for motor 104 to reach a relatively steady state speed. As an example, TOFSAV =21 seconds. Thus, memory 124 stores the speed of motor 104 as calculated in step 308 and as represented by the speed signal as SPEEDSAV at step 312 when the time in the operating state equals TOFSAV. Thereafter, control circuit 102 monitors the speed of motor 102 when the time in the operating state exceeds another predetermined time period, m, at step 314. As an example, m =40 seconds for a particular furnace which typically ignites after 45 seconds. In this manner, the risk of false indications of operating state changes between 21 and 40 seconds is eliminated.

After the time in the operating state exceeds m, control circuit 102 proceeds to step 316 for determining whether the present speed of motor 104 exceeds the stored speed by a predetermined amount. Particularly, the speed of motor 104 is compared to (SPEEDSAV+$k_2$). As an example, $k_2$=275 rpm. If motor speed exceeds (SPEEDSAV +$k_2$), then control circuit 102 determines that the density of the combustion chamber gases flowing across heat exchanger assembly 120 has decreased by an amount indicative of a change in operating state of furnace 117. Thus, control circuit 102 sets a FIREFLAG=1 at step 318. In setting FIREFLAG =1, control circuit 102 is indicating that furnace 117 changed from the first, or pre-fire, operating state to the second, or post-fire, operating state.

In an alternative embodiment, control circuit 102 compares the speed of motor 104 to (SPEEDSAV2+$k_2$) where $k_2$ is a negative number, such as −275 rpm, and SPEEDSAV2 is the motor speed saved at a time period after combustion is sensed. If motor speed is less than (SPEEDSAV2 +$k_2$), then control circuit 102 determines that the density of the combustion chamber gases flowing across heat exchanger assembly 120 has increased by an amount indicative of a change in operating state of furnace 117 from the second operating state to the first operating state. In other words, control circuit 102 alternatively detects a loss of flame in combustion chamber 118 by the relatively sudden decrease in motor speed.

Referring again to flow diagram 300, control circuit 102 proceeds to step 320 if the time in the operating state is less than m. The next steps 320, 322, 324 and 326 represent particular features of control circuit 102 for signaling furnace controller 128 that the flow of combustion chamber gases is outside the design limits of furnace 117. In step 320, control circuit 102 compares the speed of motor 104 to a minimum speed. In a preferred embodiment, the minimum speed is determined by the speed/torque curves 202, 204, 206 and 208 of FIG. 2 depending on the particular operating state and mode (high or low stage) of furnace 117. If motor speed is less than the minimum (see points 210, 214, 218 and 222 shown in FIG. 2), control circuit 102 disables the rpm output at step 322. In one preferred embodiment, control circuit 102 provides an alternating current signal having its frequency proportional to the motor speed. As disclosed in application Ser. No. 08/025,371, furnace controller 128 receives the ac signal via an interface (not shown). Thus, disabling the rpm output instructs furnace controller 128 to shut off fuel flow to combustion chamber 118 because furnace 117 is not in an acceptable operating pressure range.

Similarly, if the speed of motor 104 is not less than the minimum, control circuit 102 proceeds to step 324. In step 324, control circuit 102 compares the speed of motor 104 to a maximum speed. Again, the maximum speed is determined by the speed/torque curves 202, 204, 206 and 208 of FIG. 2 depending on the particular operating state and mode (high or low stage) of furnace 117. If motor speed exceeds the maximum (see points 212, 216, 220 and 224 shown in FIG. 2), control circuit 102 disables the rpm output at step 326. However, if motor speed is less than the maximum and greater than the minimum, control circuit 102 proceeds to step 328.

At step 308, control circuit 102 has already determined that motor 104 is operating within an acceptable speed range. Thus, control circuit 102 performs the threepiece linear fit at step 328 using one of speed/torque curves stored in memory 132, such as one of curves 202, 204 or 206, 208. In other words, processor 150 of control circuit 102 inputs motor speed and calculates the desired current according to the appropriate speed/torque curve. At step 330, control circuit 102 generates the motor control signal to provide the desired current to the windings of motor 104. In this manner, motor 104 will operate in accordance with one of the first speed/torque curves when furnace 117 is in the first operating state and in accordance with one of the second speed/torque curves when furnace 117 is in the second operating state. Flow diagram 300 ends at step 332.

Referring now to FIG. 4, one preferred embodiment of system 100 is for use with furnace 117, portions of which are described above, including combustion cheer 118 and exhaust outlet 116. As described above, fan 114 is positioned at the discharge end of heat exchanger assembly 120 or, in the alternative, at an inlet to combustion chamber 118, to induce a draft in combustion chamber 118 for moving exhaust combustion chamber gases through exhaust outlet 116. The moving gases establish a pressure drop across heat exchanger assembly 120 which forces furnace exhaust from combustion chamber 118 through heat exchanger assembly 120. Preferably, a blower 400 moves air across heat exchanger assembly 120 for conditioning the air. The conditioned air gains heat from the exhaust combustion chamber gases before the blower 400 discharges it from furnace 117.

As shown in FIG. 4, combustion chamber 118 houses a burner assembly 402 adjacent one end of heat exchanger assembly 120. A secondary or condensing heat exchanger assembly, such as heat exchanger assembly 120a, may be at the other end of heat exchanger assembly 120. Also, the discharge end of heat exchanger assembly 120 may be connected to a collector box (not shown) for collecting condensate or directly to exhaust outlet 116. In operation, furnace controller 128 controls a gas valve 404 for metering the flow of gas from fuel supply 124 to the burner assembly 402. A number of orifices in a gas manifold 406 provide gas to combustion cheer 118 where it is preferably mixed with air before being ignited by igniter 126. In the embodiment shown in FIG. 4, the ignited air-fuel mixture is pulled through heat exchanger assembly 120 in the direction shown. Draft inducer fan 114 then forces the relatively cool exhaust gases to pass through exhaust outlet 116 to the atmosphere.

In a preferred embodiment of the invention, heat exchanger assembly 120 is comprised of a plurality of heat exchanger elements 408. Each heat exchanger element 408 corresponds to a burner 410 of burner assembly 402. Thus, during operation of furnace 117, hot combustion chamber gases are pulled through each of burners 410 of burner assembly 402 into a corresponding one of heat exchanger elements 408 of heat exchanger assembly 120.

Generally, the number of heat exchanger elements 408 determines the capacity of furnace 117. As described herein, the number of heat exchanger elements 408 is also referred to as the cell size of furnace 117 wherein one heat exchanger element 408 and one corresponding burner 410 generally constitute a cell. Depending on the desired furnace capacity, a number of cells may be installed side-by-side in furnace 117. For example, a two-cell furnace typically has a capacity of about 40,000 Btu whereas a seven-cell furnace typically has a capacity of about 140,000 Btu.

In general, furnaces with different capacities will have different restrictions to air flow. As a result, the load on draft inducer motor 104 may differ from furnace to furnace and motor 104 must operate at different speeds and/or torques to produce the desired pressure in combustion chamber 118. Conventional furnaces either use different motors for different capacity furnaces or include a device, such as a choke plate, to modify the furnace installation. By modifying the furnace installation, a higher capacity furnace is simulated by increasing the restriction of a lower capacity furnace. In this manner, the draft inducer operates as if it is installed in a high capacity furnace at the expense of efficiency. Advantageously, the present invention automatically determines the furnace capacity as a function of restriction and operates motor 104 accordingly. Thus, system 100 eliminates the need for a choke plate and increases efficiency yet allows a single motor to be used in a number of furnace applications.

According to a preferred embodiment of the present invention, memory 132 stores information defining a relationship between motor speed, motor torque and parameters defining motor operation. Processor 150, which is preferably part of control circuit 102, determines the speed and torque of motor 104 and retrieves at least one parameter from memory 132 which corresponds to the determined motor speed and motor torque. Processor 150 is responsive to the retrieved parameter for defining at least one set of speed/torque curves, such as the curves shown in FIG. 2, corresponding to a desired pressure drop across heat exchanger assembly 120. Control circuit 102 then generates the motor control signal in response to the defined set of speed/torque curves so that motor 104 will operate as a function of the determined furnace capacity to control the draft induced in combustion cheer 118. In this manner, control circuit 102 provides adaptive control of furnace 117 based on restriction differences due to differences in furnace capacity but also due to any other cause.

In addition to the information relating motor operation to the speed and torque of motor 104, memory 132 preferably stores a table of predefined speed/torque values for defining the speed/torque curves under varying furnace conditions. In one embodiment, the retrieved parameter represents the number of heat exchanger elements 408 in heat exchanger assembly 120 for determining the capacity of the particular furnace 117.

In one preferred embodiment of the invention, memory 132 stores speed/torque points defining several sets of speed/torque curves, such as the curves shown in FIG. 2, wherein each set corresponds to a particular furnace capacity. The speed/torque curves corresponding to the different capacities will be generally parallel to each other wherein the curves for a lower capacity furnace will demand less torque than the curves for a higher capacity furnace. Processor 150 generates a set of appropriate speed/torque curves from the stored points or selects a set of appropriate curves from several stored in memory 132 for operating motor 104 depending on the furnace capacity.

In the alternative, the retrieved parameter defines at least one delta value corresponding to the number of heat exchanger elements 408. Processor 150 adapts each of the predefined speed/torque values as a function of the delta value thereby to define a set of speed/torque curves corresponding to the desired pressure drop across heat exchanger assembly 120 based on the determined furnace capacity. By determining the cell size of furnace 117, processor 150 is able to adapt a single set of speed/torque curves stored in memory 132 for use with any number of different furnaces having different capacities.

As described above, furnace 117 is operable in first and second operating states. According to the present invention, processor 150 is responsive to the retrieved parameter for defining first and second sets of speed/torque curves corresponding to the desired pressure drop across heat exchanger assembly 120 for the first and second operating states, respectively. Thus, motor 104 operates in accordance with one or more of the first speed/torque curves when furnace 117 is in the first operating state and in accordance with one or more of the second speed/torque curves when furnace 117 is in the second operating state.

Also, furnace 117 includes furnace controller 128 providing a furnace operating signal for causing furnace 117 to operate in either a high stage or a low stage. In a preferred embodiment, processor 150 is responsive to the retrieved parameter for defining first and second sets of speed/torque curves corresponding to the desired pressure drop across heat exchanger assembly 120 for the high and low stages, respectively. Thus, motor 104 operates in accordance with one or more of the first speed/torque curves when furnace 117 is operating in the high stage and in accordance with one or more of the second speed/torque curves when furnace 117 is operating in the low stage.

Figure 5A:
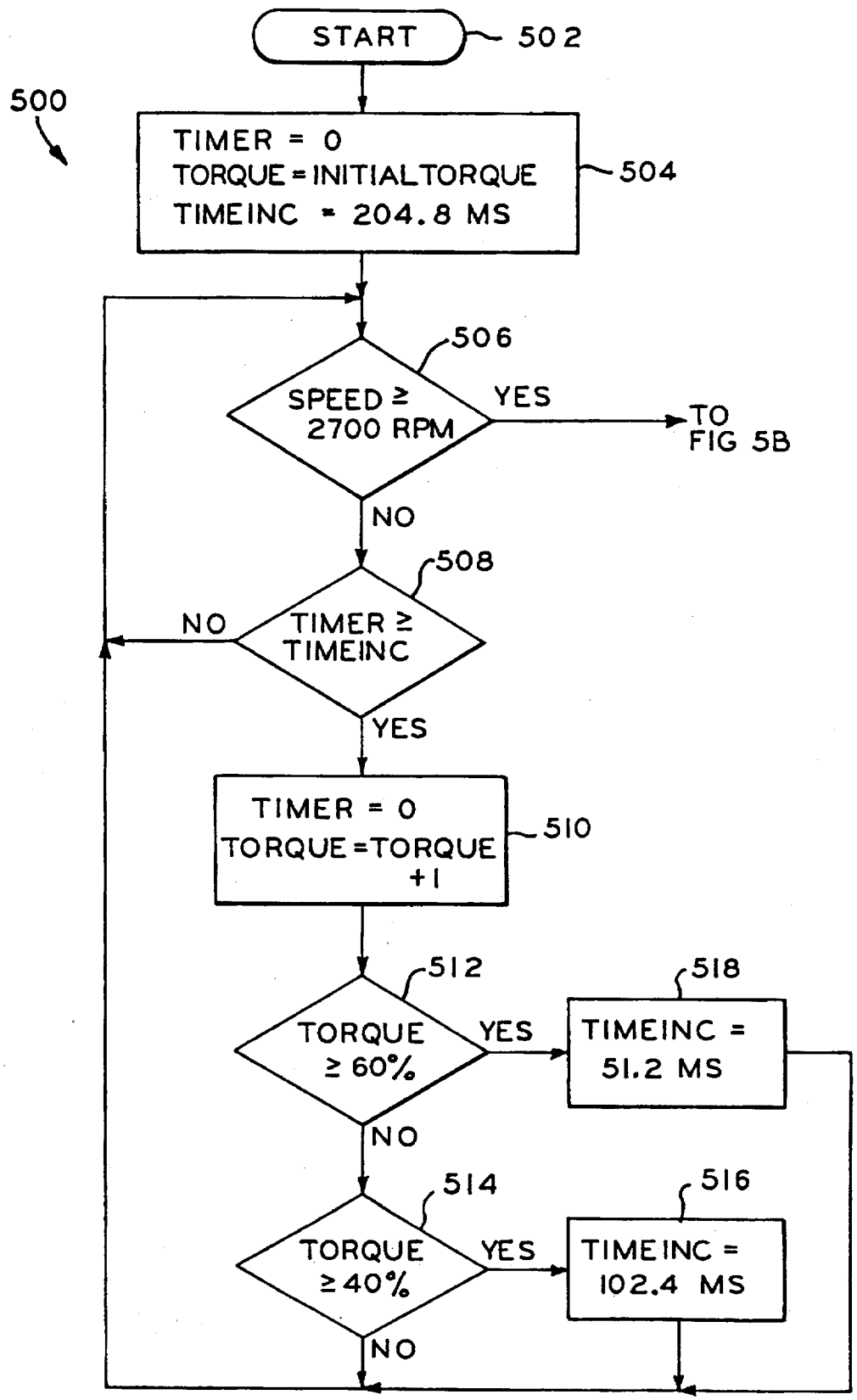
FIGS. 5A and 5B illustrate a flow diagram of the operation of the control circuit of FIG. 1 according to a preferred embodiment of the invention.
Figure 5B:
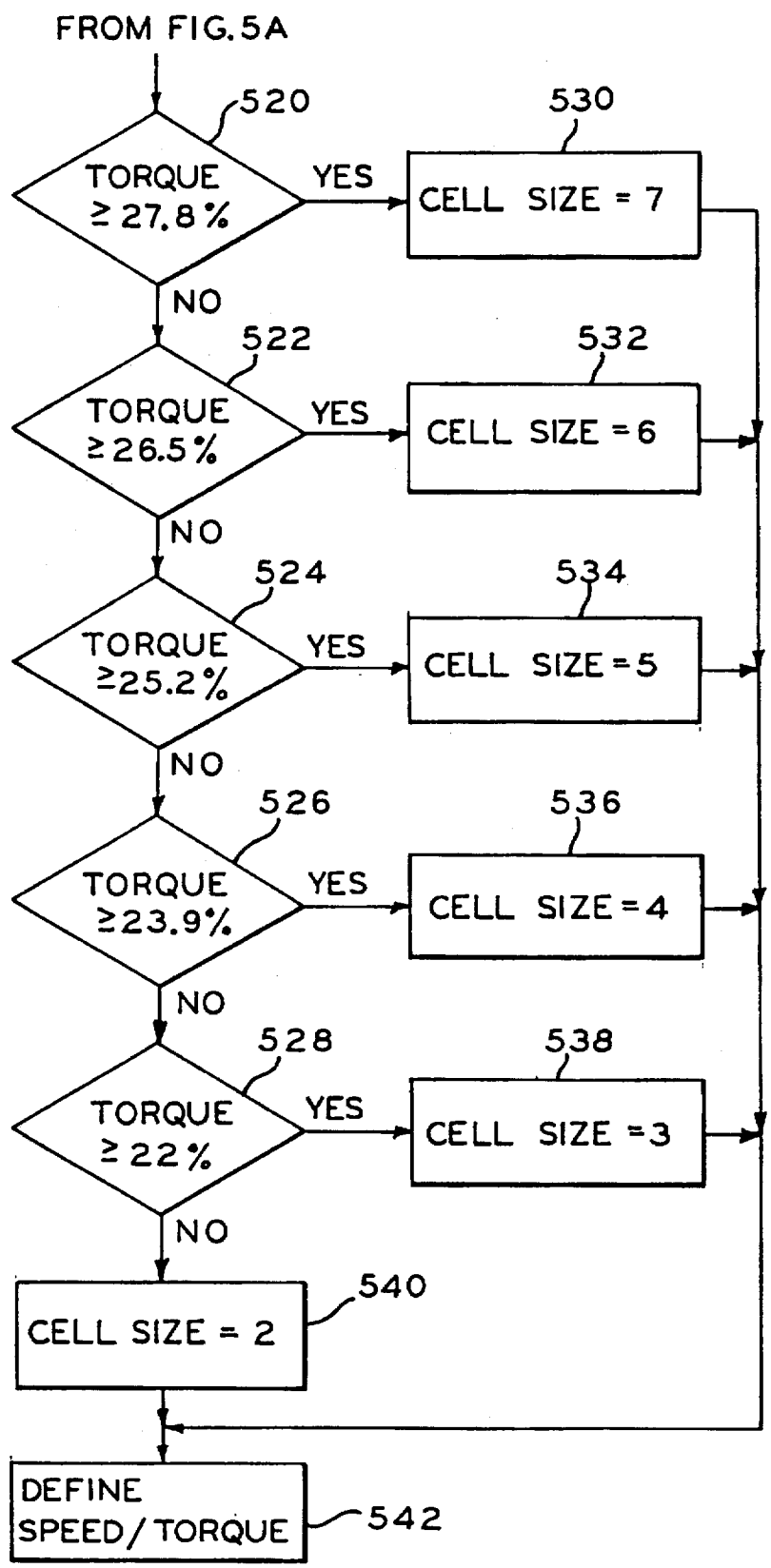

FIGS. 5A and 5B illustrate the operation of system 100 in the form of a preferred flow diagram 500 beginning at step 502. Processor 150 initializes its operation at step 504 by instructing control circuit 102 to generate the motor control signal to set the current value so that the windings of motor 104 are energized to produce a first torque, such as 15% of the maximum motor torque. Processor 150 also initializes a timer 152, preferably resident in control circuit 102, for timing a first interval of time during which motor 104 operates to produce the first torque. At step 504, processor 150 also sets the first interval to, for example, 204.8 ms.

As described above, a speed circuit, preferably resident in control circuit 102, provides a speed signal representative of the speed of motor 104 in response to the speed/torque feedback via line 110. As motor 104 rotates fan 114, processor 150 compares the motor speed as represented by the speed signal to a reference speed, such as 2700 rpm, at step 506. The timer 152 times the first interval during which motor 104 produces the first torque. If the motor speed is less than the reference speed at step 506, processor 150 determines at step 508 whether timer 152 has timed out the first interval. If not, processor 150 repeats steps 506 and 508. On the other hand, if timer 152 times out the first interval and the motor speed is still less than the reference speed, processor 150 proceeds to step 510.

At step 510, processor 150 resets timer 152 and causes control circuit 102 to incrementally increase the current value for increasing the torque of motor 104. Thus, control circuit 102 is responsive to the speed signal and timer 152 for generating the appropriate motor control signal to incrementally increase the motor torque above the first torque if the speed signal indicates that the speed of motor 104 is less than the reference speed after the first interval of time is timed by timer 152. Processor 150 causes control circuit 102 to continue to incrementally increase the motor torque at intervals of 204.8 ms when the speed of motor 104 is less than the reference speed.

Processor 150 alters the current ramp rate at steps 512 and 514. If processor 150 determines at step 514 that the motor torque has been increased in excess of a second torque, such as 40% of the maximum torque, processor 150 resets the timed interval at step 516 to a second interval of time less than the first interval. For example, the second interval is 102.4 ms. Processor 150 causes control circuit 102 to continue to incrementally increase the motor torque at intervals of 102.4 ms when the speed of motor 104 is less than the reference speed. If processor 150 determines at step 512 that the motor torque exceeds, for example, 60% of the maximum torque, processor 150 resets the timed interval at step 518 to a third interval of time less than the second interval. The third interval is, for example, 51.2 ms. Processor 150 then causes control circuit 102 to incrementally increase the motor torque every 51.2 ms as long as the motor speed remains less than the reference speed.

Processor 150 operates to ramp the current and, thus, the motor torque at the variable rate described above with respect to steps 504, 512, 514, 516 and 518 until the motor speed reaches the reference speed. As shown in flow diagram 500, the variable ramp rate is initially slower because at low speeds, relatively small changes in torque can cause relatively large changes in motor speed. After successively increasing the current value every 204.8 ms, the ramp rate is increased by increasing the current value every 102.8 ms as needed to achieve the reference speed and then increasing the current value every 51.2 ms as needed to achieve the reference speed. Once processor 150 determines at step 506 that the motor speed has reached the reference speed, processor 150 proceeds to operate according to the portion of flow diagram 500 shown in FIG. 5B.

At steps 520, 522, 524, 526 and 528, processor 150 preferably compares the determined motor torque to a plurality of torque ranges stored in memory 132. Processor 150 determines the torque of motor 104 when the motor speed reaches the reference speed so that the parameter which corresponds to the determined motor torque and the reference motor speed is retrieved from memory 132. In this embodiment, the retrieved parameter corresponds to one of the torque ranges which includes the determined motor torque. As an example, if the motor torque needed to achieve the reference speed exceeds 27.8% at step 520, processor 150 retrieves a parameter at step 530 which corresponds to seven heat exchanger elements 408. In other words, processor 150 determines that the cell size of furnace 117 is seven. Further to the example, if processor 150 determines at step 522 that the motor torque is between 27.8% and 26.5%, it retrieves a parameter corresponding to a cell size of six at step 532; if processor 150 determines at step 524 that the motor torque is between 26.5% and 25.2%, it retrieves a parameter corresponding to a cell size of five at step 534; if processor 150 determines at step 526 that the motor torque is between 25.2% and 23.9%, it retrieves a parameter corresponding to a cell size of four at step 536; if processor 150 determines at step 528 that the motor torque is between 23.9% and 22%, it retrieves a parameter corresponding to a cell size of three at step 538; and if processor 150 determines at step 528 that the motor torque is less than 22%, it retrieves a parameter corresponding to a cell size of two at step 540.

In one preferred embodiment of the invention, at step 542, processor 150 looks up a table of predefined speed/torque values stored in memory 132 in response to the retrieved parameter. Processor 150 uses the stored values to define speed/torque curves under varying furnace conditions. As an example, the stored table includes a set of four points defining each of the speed/torque curves of FIG. 2. Control circuit 102 is responsive to the retrieved parameter for generating motor control signals as a function of a set of speed/torque curves developed by performing a three-piece linear fit of the four points stored in memory 132. As such, processor 150 defines a speed/torque curve corresponding to, for example, pre-fire low stage operation. Processor 150 preferably looks up additional sets of speed/torque points to similarly define appropriate curves for post-fire low stage operation as well as pre- and post-fire high stage operation. In the alternative, processor 150 retrieves a delta, or offset, value from memory 132 corresponding to the determined furnace capacity and adds or subtracts it from the defined speed/torque curve to define additional curves for operating furnace 117 in another mode.

In the alternative, processor 150 defines the speed and/or torque of motor 104 by retrieving a parameter defining at least one delta value corresponding to the number of heat exchanger elements 408. Processor 150 adapts each of the applicable speed/torque values stored in memory 132 as a function of the delta value thereby to define a set of speed/torque curves corresponding to the desired pressure drop across heat exchanger assembly 120 based on the determined furnace capacity.

FIGS. 6A and 6B illustrate the operation of system 100 according to another preferred embodiment of the invention in the form of a flow diagram 600 beginning at step 602. Processor 150 initializes its operation at step 604 by instructing control circuit 102 to generate the motor control signal to set the current value so that the windings of motor 104 are energized to produce a reference torque, such as 21% of the maximum motor torque. In this embodiment, processor 150 determines the speed of motor 104 which results when motor 104 is operating to produce the reference torque.

Processor 150 preferably determines the motor speed a period of time after motor 104 begins operating and, thus, allows the motor speed to stabilize. At step 606, processor 150 delays for a period of time, such as five seconds, after motor 104 begins rotating fan 114. Processor 150 then measures the motor speed as represented by the speed signal at step 608.

At steps 610, 612, 614, 616 and 618, processor 150 preferably compares the determined motor speed to a plurality of speed ranges stored in memory 132. Processor 150 determines the speed of motor 104 when the motor torque is at the reference torque so that the parameter which corresponds to the reference motor torque and the determined motor speed is retrieved from memory 132. In this embodiment, the retrieved parameter corresponds to one of the speed ranges which includes the determined motor speed. As an example, if the motor speed which results when motor 104 is operating to produce the reference torque exceeds 2600 rpm at step 610, processor 150 retrieves a parameter at step 620 which corresponds to two heat exchanger elements 408. In other words, processor 150 determines that the cell size of furnace 117 is two. Further to the example, if processor 150 determines at step 612 that the motor speed is between 2600 rpm and 2420 rpm, it retrieves a parameter corresponding to a cell size of three at step 622; if processor 150 determines at step 614 that the motor speed is between 2420 rpm and 2310 rpm, it retrieves a parameter corresponding to a cell size of four at step 624; if processor 150 determines at step 616 that the motor speed is between 2310 rpm and 2200 rpm, it retrieves a parameter corresponding to a cell size of five at step 626; if processor 150 determines at step 618 that the motor speed is between 2200 rpm and 2100 rpm, it retrieves a parameter corresponding to a cell size of six at step 628; and if processor 150 determines at step 618 that the motor speed is less than 2100 rpm, it retrieves a parameter corresponding to a cell size of seven at step 630.

In a manner similar to flow diagram 500, at step 632, processor 150 looks up a table of predefined speed/torque values stored in memory 132 for defining speed/torque curves, such as the curves shown in FIG. 2, under varying furnace conditions.

Figure 7B:
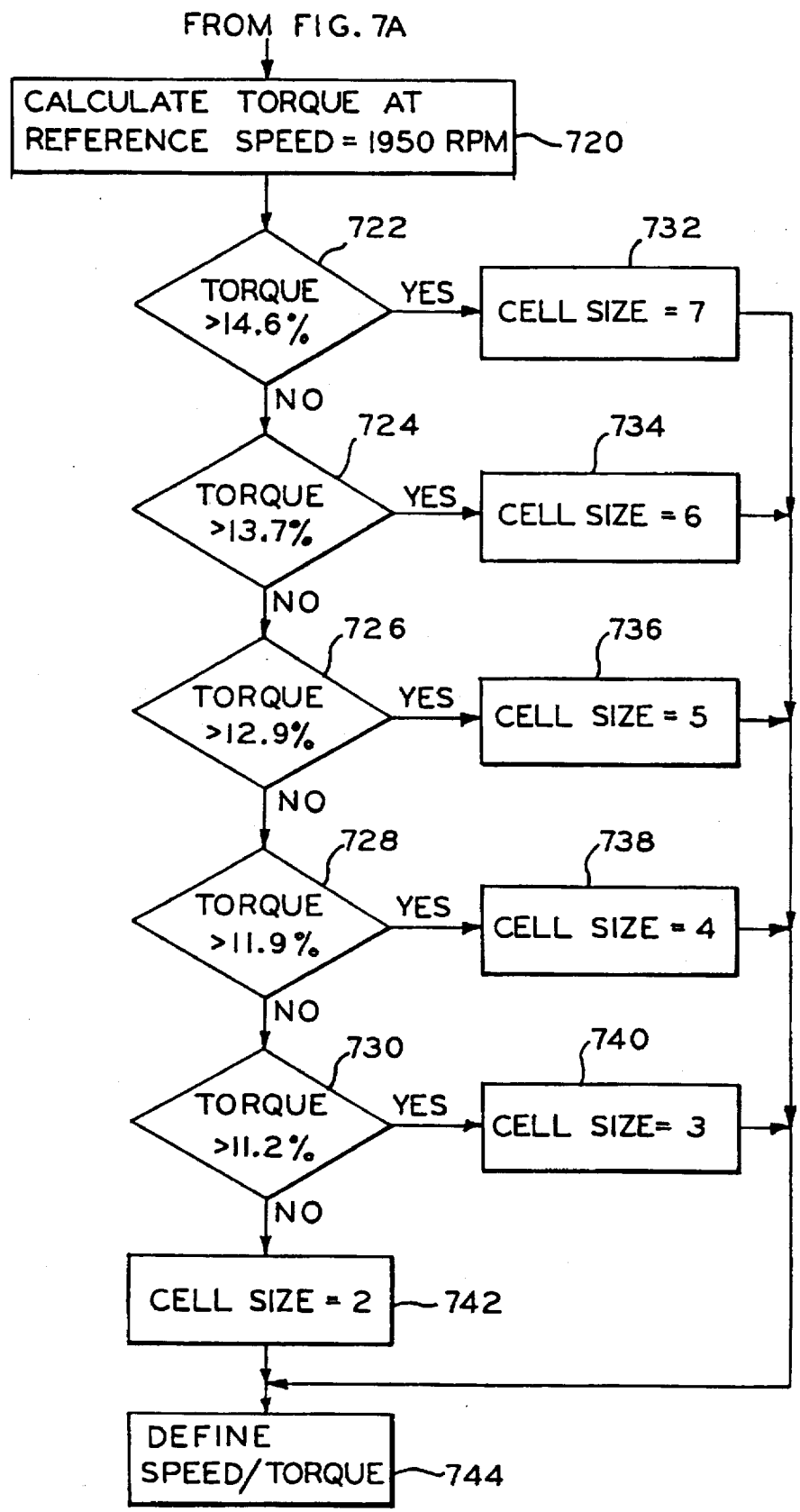

FIGS. 7A and 7B illustrate the operation of system 100 according to yet another preferred embodiment of the invention in the form of a flow diagram 700 beginning at step 702. According to the flow diagram 700, control circuit 102 ramps the current value to increase motor torque in a manner similar to flow diagram 500. In this embodiment, both torque and speed are determined when pressure switch 146 activates. Based on the predefined information stored in memory 132, processor 150 then determines the cell size of furnace 117.

Processor 150 initializes its operation at step 704 by instructing control circuit 102 to generate the motor control signal for energizing the windings of motor 104 to produce a first torque, such as 15% of the maximum motor torque. Processor 150 also initializes timer 152 for timing the first interval of time during which motor 104 operates to produce the first torque. At step 704, processor 150 also sets the first interval to, for example, 204.8 ms.

As described above, pressure switch 146 provides a pressure signal representative of a reference pressure across heat exchanger assembly 120. The reference pressure may be representative of a minimum pressure or, in the alternative, a pressure set point for calibrating system 100. As motor 104 rotates fan 114, processor 150 determines at step 706 when pressure switch 146 indicates that the pressure drop has reached the reference pressure. Timer 152 times the first interval of time during which motor 104 produces the first torque. If the pressure drop across heat exchanger assembly 120 is less than the reference pressure at step 706, processor 150 determines at step 708 whether timer 152 has timed out the first interval. If not, processor 150 repeats steps 706 and 708. On the other hand, if timer 152 times out the first interval and the pressure drop is still less than the reference pressure, processor 150 proceeds to step 710.

At step 710, processor 150 resets timer 152 and causes control circuit 102 to incrementally increase the current value for increasing the torque of motor 104. Thus, control circuit 102 is responsive to the pressure signal and timer 152 for generating the appropriate motor control signal to incrementally increase the motor torque above the first torque if the pressure signal indicates that the pressure drop across heat exchanger assembly 120 is less than the reference pressure after the first interval of time is timed by timer 152. Processor 150 causes control circuit 102 to continue to incrementally increase the motor torque at intervals of 204.8 ms when the pressure drop is less than the reference pressure.

Processor 150 alters the current ramp rate at steps 712 and 714. If processor 150 determines at step 714 that the motor torque has been increased in excess of a second torque, such as 40% of the maximum torque, processor 150 resets the timed interval at step 716 to a second interval of time less than the first interval. For example, the second interval is 102.4 ms. Processor 150 causes control circuit 102 to continue to incrementally increase the motor torque at intervals of 102.4 ms when the pressure drop is less than the reference pressure. If processor 150 determines at step 712 that the motor torque exceeds, for example, 60% of the maximum torque, processor 150 resets the timed interval at step 718 to a third interval of time less than the second interval. The third interval is, for example, 51.2 ms. Processor 150 then causes control circuit 102 to incrementally increase the motor torque every 51.2 ms as long as the pressure drop remains less than the reference pressure.

Processor 150 operates to ramp the current and, thus, the motor torque at the variable rate described above with respect to steps 704, 712, 714, 716 and 718 until pressure switch 146 activates. After successively increasing the current value every 204.8 ms, the ramp rate is increased by increasing the current value every 102.8 ms as needed to achieve the reference pressure and then increasing the current value every 51.2 ms as needed to achieve the reference pressure. Once pressure switch 146 activates at step 706, processor 150 proceeds to operate according to the portion of flow diagram 700 shown in FIG. 7B. In this embodiment, pressure switch 146 activates when the pressure drop across heat exchanger assembly 120 is 0.25 inches of water for an 80%, two-stage furnace, for example.

At step 720, processor 150 determines the motor torque needed to activate pressure switch 146 and, based on the determined motor torque, calculates a torque value with respect to a reference speed. In other words, processor 150 normalizes the determined motor torque. In this embodiment, the stored information includes a plurality of torque ranges wherein the retrieved parameter corresponds to one of the torque ranges which includes the normalized motor torque.

As an example, processor 150 determines the motor torque when pressure switch 146 activates and normalizes it to a reference speed of 1950 rpm (represented by $SPEED_{REF}=100$, where SPEED is an eight-bit number between 0 and 255 corresponding to the speed of motor 104). By doing so, processor 150 accommodates for the fact that the motor speed will vary when the reference pressure is reached depending on the restriction of furnace 117 and that the determined motor torques for different capacity furnaces may overlap if not calculated with respect to a reference speed. The reference speed is preferably selected as the minimum desired speed for calculating the normalized torque value. Processor 150 normalizes the motor torque by subtracting the reference speed, 1950 rpm, from the determined speed as represented by the speed signal when pressure switch 146 indicates that the pressure drop across heat exchanger assembly 120 is the reference pressure. The difference (i.e., $SPEED-SPEED_{REF}$) is multiplied by a slope, m, and then subtracted from the determined motor torque. Thus, processor 150 solves for the normalized motor torque by the equation: $TORQUE_{1950}=TORQUE-m(SPEED-100)$. In a preferred embodiment, the normalized values for a two-cell furnace and for a seven-cell furnace diverge when m=0.5 (see Table 1, below).

TABLE 1

| | TWO-CELL | | SEVEN-CELL | |
|---|---|---|---|---|
| SPEED (RPM) | TORQUE | TORQUE$_{1950}$ | TORQUE | TORQUE$_{1950}$ |
| 1950 | 50 | 50 | 75 | 75 |
| 2200 | 54 | 48 | 83 | 77 |
| 2500 | 60 | 46 | 91 | 77 |
| 3000 | 70 | 43 | 106 | 79 |
| 3500 | 83 | 43.5 | 123 | 83.5 |
| 4000 | 97 | 44.5 | 145 | 92.5 |

Referring again to FIG. 7B, at steps 722, 724, 726, 728 and 730, processor 150 preferably compares the normalized motor torque to a plurality of torque ranges stored in memory 132. It is to be understood that the values of normalized torque will vary if they are calculated with respect to a different reference speed or if the slope m differs. As an example, if the normalized motor torque exceeds 14.6% at step 722, processor 150 retrieves a parameter at step 732 which corresponds to seven heat exchanger elements 408. In other words, processor 150 determines that the cell size of furnace 117 is seven. Further to the example, if processor 150 determines at step 724 that the normalized motor torque is between 14.6% and 13.7%, it retrieves a parameter corresponding to a cell size of six at step 734; if processor 150 determines at step 726 that the normalized motor torque is between 13.7% and 12.9%, it retrieves a parameter corresponding to a cell size of five at step 736; if processor 150 determines at step 728 that the normalized motor torque is between 12.9% and 11.9%, it retrieves a parameter corresponding to a cell size of four at step 738; if processor 150 determines at step 730 that the normalized motor torque is between 11.9% and 11.2%, it retrieves a parameter corresponding to a cell size of three at step 740; and if processor 150 determines at step 730 that the normalized motor torque is less than 11.2%, it retrieves a parameter corresponding to a cell size of two at step 742.

In a manner similar to flow diagram 500 and 600, at step 744, processor 150 looks up a table of predefined speed/torque values stored in memory 132 for defining speed/torque curves, such as the curves shown in FIG. 2, under varying furnace conditions. In the alternative, processor 150 fits a straight line through the speed and torque point at which pressure switch 146 activates for approximating the operating region of a speed/torque curve. Processor 150 then retrieves at least one delta, or offset, value for adjusting the straight line approximation to define speed/torque curves for pre-fire (high and low stages) and post-fire (high and low stages) operation. Further, it is to be understood that furnace 117 may include more than one pressure switch for providing additional calibration points for processor 150 to define the speed/torque curves.

Figure 8A:
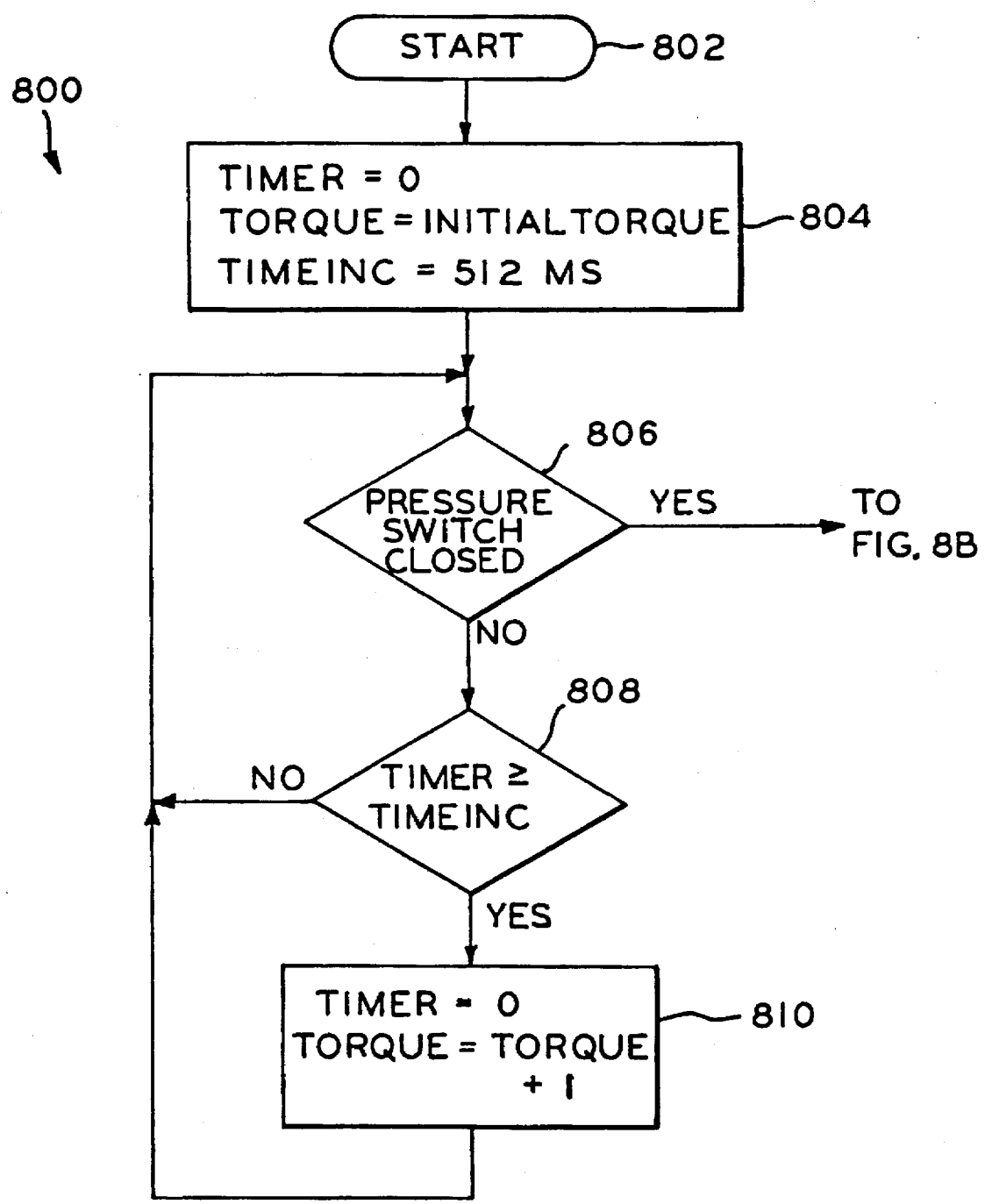
FIGS. 8A and 8B illustrate a flow diagram of the operation of the control circuit of FIG. 1 according to yet another preferred embodiment of the invention.
Figure 8B:
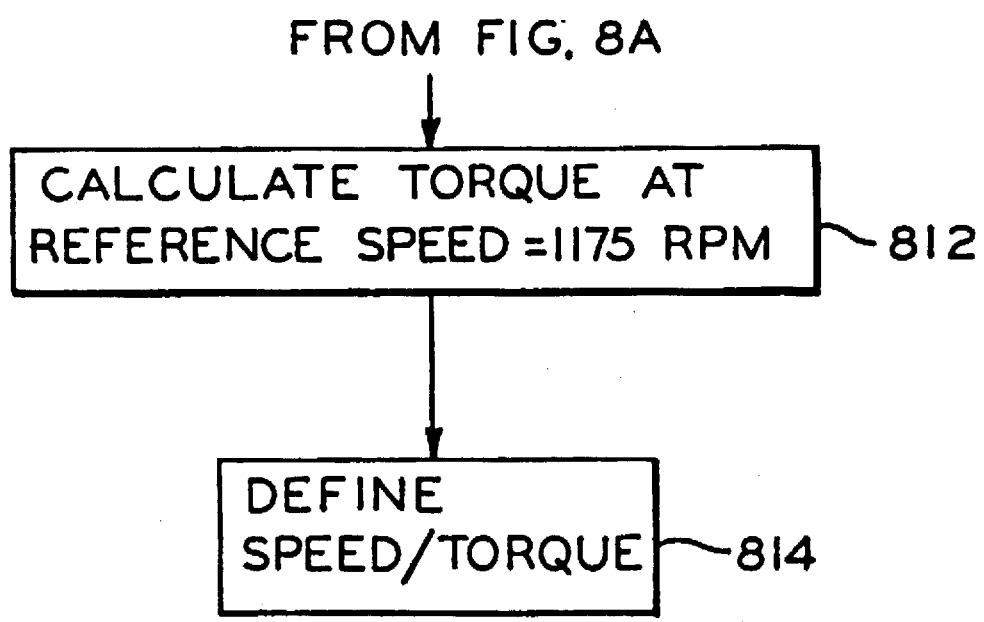

FIGS. 8A and 8B illustrate the operation of system 100 according to yet another preferred embodiment of the invention in the form of a flow diagram 800 beginning at step 802. According to the flow diagram 800, control circuit 102 initially ramps the current value to increase motor torque in a manner similar to flow diagram 500 and 700. In this embodiment, both torque and speed are determined when pressure switch 146 activates.

Processor 150 initializes its operation at step 804 by instructing control circuit 102 to generate the motor control signal for energizing the windings of motor 104 to produce a first torque, such as 15% of the maximum motor torque. Processor 150 also initializes timer 152 for timing the first interval of time during which motor 104 operates to produce the first torque. At step 804, processor 150 also sets the first interval to, for example, 512 ms. As motor 104 rotates fan 114, processor 150 determines at step 806 when pressure switch 146 indicates that the pressure drop across heat exchanger assembly 120 has reached the reference pressure. Timer 152 times the first interval of time during which motor 104 produces the first torque. If the pressure drop across heat exchanger assembly 120 is less than the reference pressure at step 806, processor 150 determines at step 808 whether timer 152 has timed out the first interval. If not, processor 150 repeats steps 806 and 808. On the other hand, if timer 152 times out the first interval and the pressure drop is still less than the reference pressure, processor 150 proceeds to step 810.

At step 810, processor 150 resets timer 152 and causes control circuit 102 to incrementally increase the current value for increasing the torque of motor 104. Thus, control circuit 102 is responsive to the pressure signal and timer 152 for generating the appropriate motor control signal to incrementally increase the motor torque above the first torque if the pressure signal indicates that the pressure drop across heat exchanger assembly 120 is less than the reference pressure after the first interval of time is timed by timer 152. Processor 150 causes control circuit 102 to continue to incrementally increase the motor torque every 512 ms when the pressure drop is less than the reference pressure. Once pressure switch 146 activates at step 806, processor 150 proceeds to operate according to the portion of flow diagram 800 shown in FIG. 8B. In this embodiment, pressure switch 146 activates when the pressure drop across heat exchanger assembly 120 is 0.25 inches of water for an 80%, two-stage furnace, for example.

At step 812, processor 150 determines the motor torque needed to activate pressure switch 146 and, based on the determined motor torque, calculates a torque value with respect to a reference speed in a manner similar to step 720 of FIG. 7B. As an example, processor 150 determines the motor torque when pressure switch 146 activates and normalizes it to a reference speed of 1175 rpm (represented by $SPEED_{REF}=60$, where SPEED is an eight-bit number between 0 and 255 corresponding to the speed of motor 104). Processor 150 normalizes the motor torque by subtracting the reference speed, 1175 rpm, from the determined speed as represented by the speed signal when pressure switch 146 indicates that the pressure drop across heat exchanger assembly 120 is the reference pressure. The difference (i.e., $SPEED-SPEED_{REF}$) is multiplied by a slope, m, and then added to the determined motor torque. Thus, processor 150 solves for the normalized motor torque by the equation: $TORQUE_{1175}=TORQUE+m(SPEED-60)$. In a preferred embodiment, the slope is a constant value corresponding to each of the four operating conditions of a two-stage furnace, i.e., pre-fire (high and low stages) and post-fire (high and low stages), divided by 256.

In a manner similar to flow diagram 500, 600, and 700, at step 814, processor 150 looks up a table of predefined speed/torque values stored in memory 132 for defining speed/torque curves, such as the curves shown in FIG. 2, under varying furnace conditions. In the embodiment of FIGS. 8A and 8B, processor 150 preferably defines a calibration point as a function of the speed/torque point corresponding to the normalized torque value and the reference speed. Preferably, processor 150 fits a straight line through the defined calibration point for approximating the operating region of a speed/torque curve. According to the invention, the calibration point is defined by a delta value stored in memory 132 corresponding to each of the four operating conditions of a two-stage furnace, i.e., pre-fire (high and low stages) and post-fire (high and low stages). In other words, each of the speed/torque curves defined at step 814 includes a point offset by the retrieved delta value from the speed/torque point corresponding to the normalized torque value and the reference speed in one preferred embodiment.

Further, it is to be understood that furnace 117 may include more than one pressure switch for providing additional calibration points for processor 150 to define the speed/torque curves. According to an alternative embodiment of the invention, pressure switch 146 is embodied as a low pressure switch for determining when the pressure drop across heat exchanger assembly 120 corresponds to a low stage minimum pressure and as a high pressure switch for determining when the pressure drop across heat exchanger assembly 120 corresponds to a high stage minimum pressure. Thus, processor 150 preferably defines a low stage calibration point as a function of the normalized motor torque value at the reference speed when the low pressure switch activates and defines a high stage calibration point as a function of the normalized motor torque value at the reference speed when the high pressure switch activates. In this instance, processor 150 preferably fits a straight line through the defined low stage and high stage calibration points for approximating the operating region of a speed/torque curve. The low stage calibration point is defined by a delta value stored in memory 132 corresponding to each of the low stage (pre-fire and post-fire) operating conditions and the high stage calibration point is defined by a delta value stored in memory 132 corresponding to each of the high stage (pre-fire and post-fire) operating conditions. For the two pressure switch embodiment, the interval timed by timer 152 preferably increases from 512 ms to 1024 ms upon closure of the low pressure switch to decrease the acceleration of motor 104.

Figure 9A:
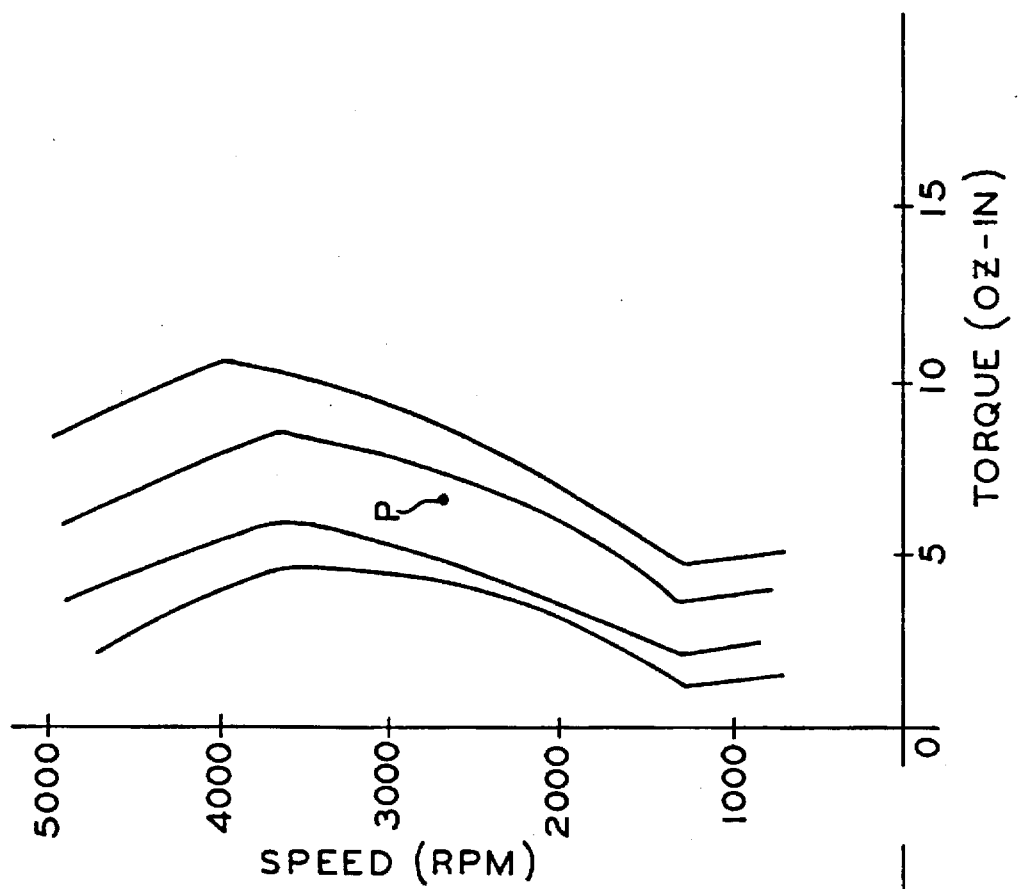
Figure 9B:
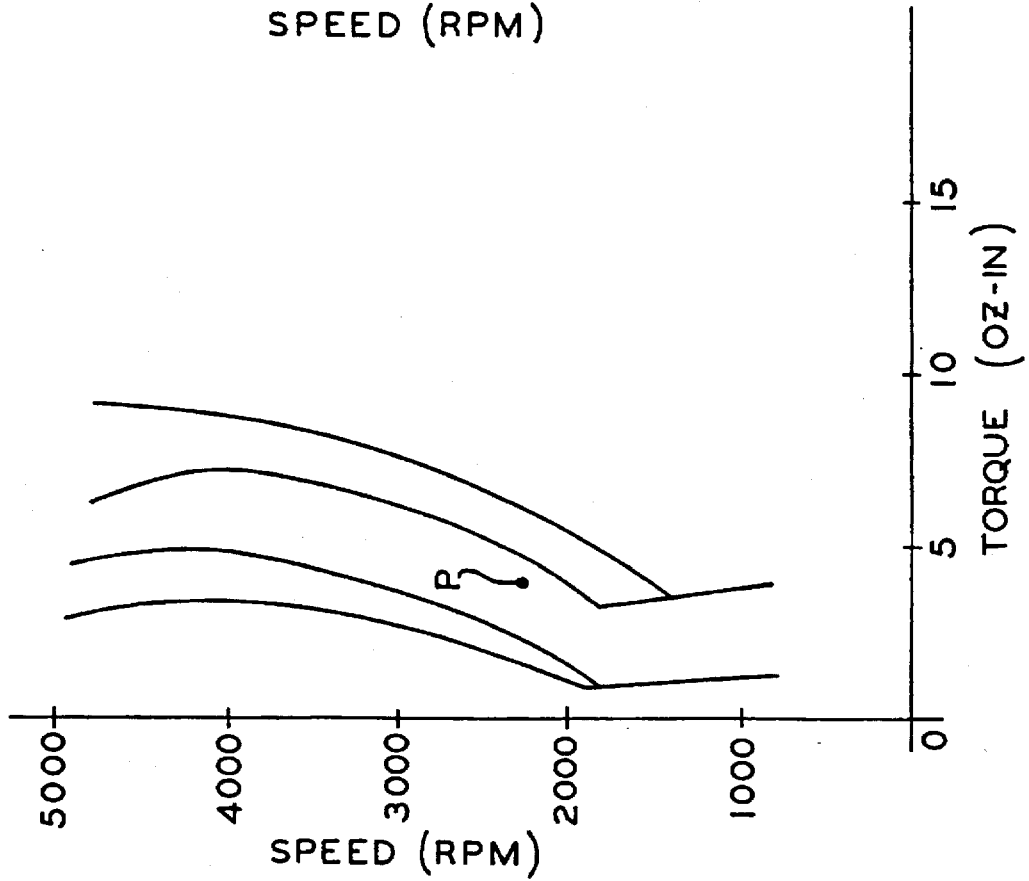
Figure 9F:
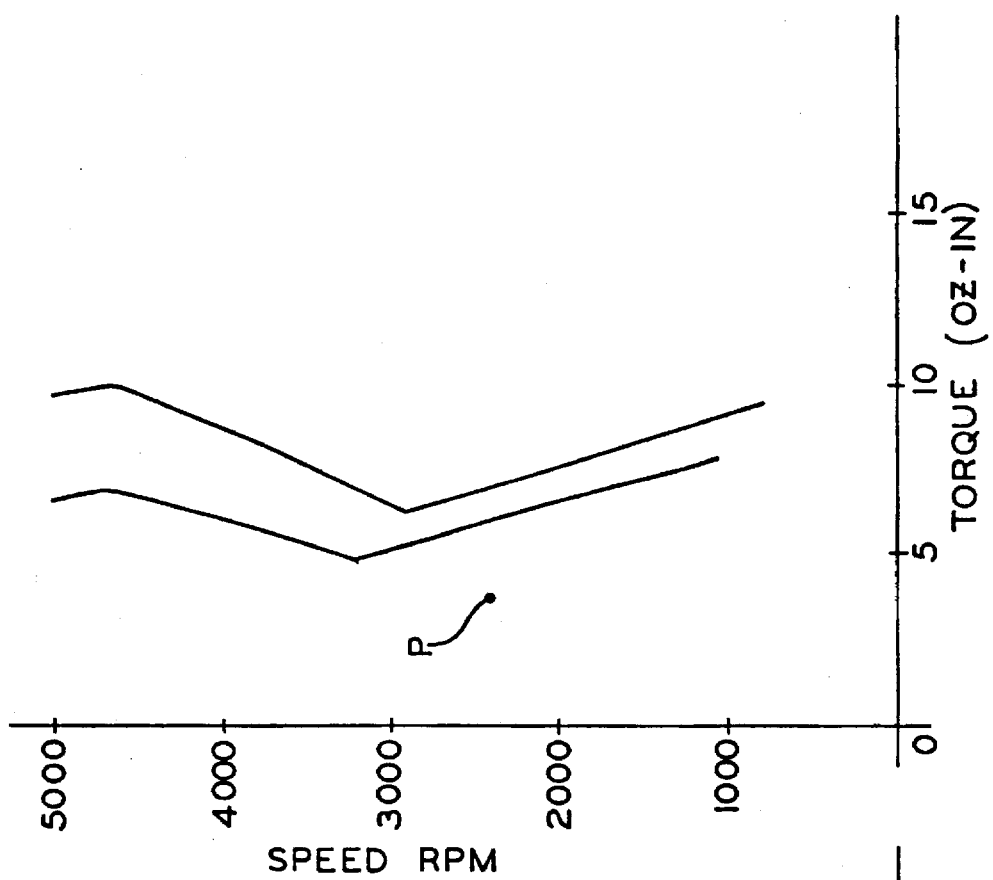
Figure 9E:
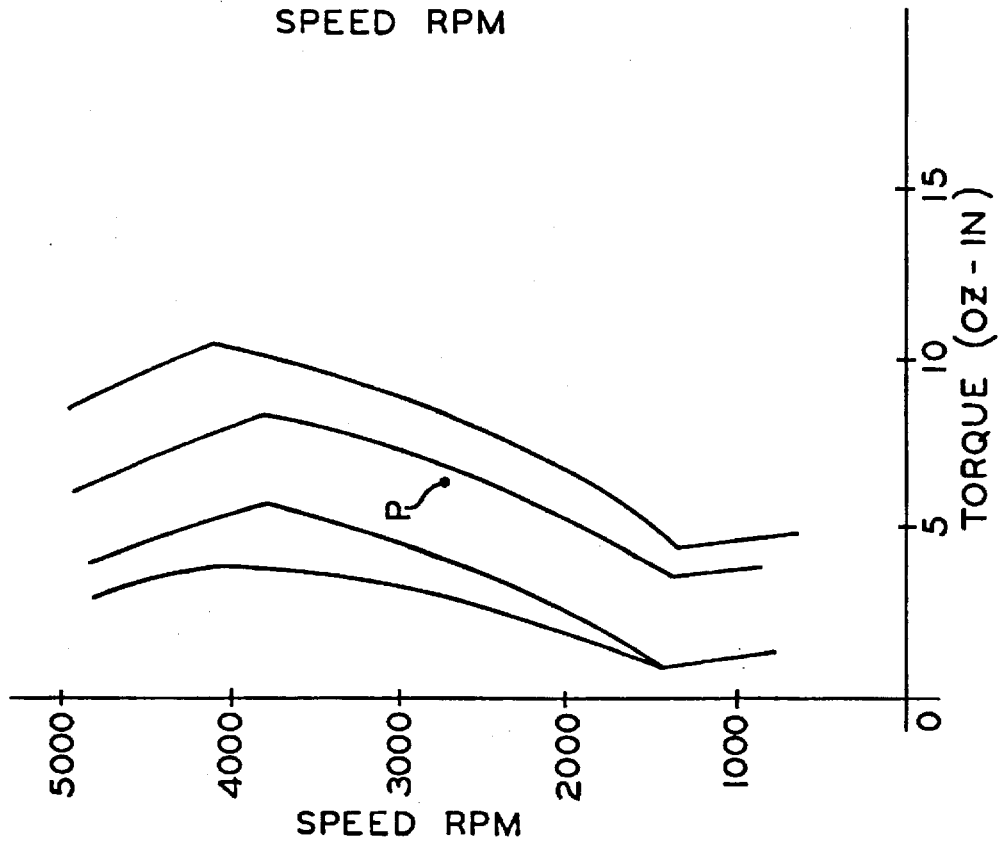

FIGS. 9A–9F illustrate exemplary speed vs. torque curves defining the operating conditions of motor 104 according to flow diagram 800 of FIGS. 8A and 8B. The exemplary speed/torque curves are illustrated as smooth lines for clarity. In particular, FIGS. 9A, 9B, 9C and 9D show speed/torque curves defined at step 814 in a single pressure switch embodiment of the invention; FIG. 9E shows speed/torque curves defined at step 814 in a high and low pressure switch embodiment of the invention; and FIG. 9F shows speed/torque curves defined at step 814 using a four-point, three-piece linear fit rather than the straight line fit of FIGS. 9A–9D. It is to be understood that the curves of FIGS. 9A–9F, as well as the curves of FIG. 2, are merely exemplary and may vary for applications other than those specifically disclosed herein. Further, processor 150 is capable of defining speed/torque curves such as those shown in FIGS. 9A–9F, as well as those shown in FIG. 2, according to flow diagrams 500, 600 and/or 700.

In each of FIGS. 9A–9F, the speed/torque point corresponding to the normalized torque value and the reference speed for the particular set of curves is shown at reference character P. As shown, each of the speed/torque curves are offset from the speed/torque point P by the retrieved delta value corresponding to pre-fire (high and low stages) and post-fire (high and low stages) operation, respectively. Further, the exemplary curves of FIGS. 9A–9F include portions for limiting the maximum and minimum duty cycle as a function of the maximum and minimum operating points for low and high stage, cold and fired operation. In general, FIGS. 9A–9F illustrate curves for various points P and/or various maximum/minimum operating points for either cold or fired operation.

In yet another preferred embodiment of the present invention, memory 132 stores parameters representative of error corrections to compensate for the errors associated with pressure switch tolerances as well as motor tolerances. For example, if pressure switch 146 activates in response to a pressure drop across heat exchanger assembly 120 of 0.25±0.05 inches of water, processor 150 adjusts its calculations based on the actual pressure at which pressure switch 146 activates as measured during final testing of furnace 117.

Although FIGS. 5A–5B, 6A–6B, 7A–7B and 8A–8B are directed to operation of processor 150 to distinguish between cell sizes ranging from two to seven, it is to be understood that the present invention is also applicable to determine the capacity of furnaces of any size.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A draft inducer apparatus for use with a furnace that includes a combustion chamber and an exhaust outlet for venting exhaust combustion chamber gases from the furnace and that also includes at least one heat exchanger assembly for extracting heat from the exhaust combustion chamber gases and transferring heat to conditioned air, and for use with a fan for inducing a draft in the combustion chamber which causes a pressure drop across the heat exchanger assembly for moving the exhaust combustion cheer gases through the exhaust outlet, said apparatus comprising:

a motor including a shaft for driving the fan in response to a motor control signal;

a memory for storing information defining a relationship between motor speed, motor torque and parameters defining motor operation, said stored information including a table of predefined speed/torque values for defining a set of speed/torque curves;

a pressure switch providing a pressure signal representative of a reference pressure across the heat exchanger assembly;

a control circuit responsive to the pressure signal for generating the motor control signal to increase the torque of the motor when the pressure signal indicates that the pressure drop across the heat exchanger assembly is less than the reference pressure;

a processor for determining the speed and torque of the motor when the pressure drop corresponds to the reference pressure and for retrieving from the memory a retrieved parameter defining at least one delta value corresponding to the determined motor speed and motor torque, said processor adapting the predefined speed/torque values as a function of the delta value thereby to define the speed/torque curves corresponding to a desired pressure drop across the heat exchanger assembly, said control circuit generating the motor control signal in response to the defined set of speed/torque curves thereby to control the draft induced in the combustion chamber whereby the motor is operated as a function of the determined motor speed and motor torque when the pressure drop corresponds to the reference pressure.

2. The apparatus of claim 1 wherein the memory is part of the processor and stores the table of predefined speed/torque values for defining the speed/torque curves under varying furnace conditions.

3. The apparatus of claim 1 wherein the heat exchanger assembly includes a plurality of heat exchanger elements which determine furnace capacity, said furnace capacity affecting the pressure drop across the heat exchanger assembly, and wherein the defined delta value corresponds to the number of heat exchanger elements in the heat exchanger assembly for determining the furnace capacity whereby the defined speed/torque curves correspond to the desired pressure drop across the heat exchanger assembly based on the determined furnace capacity.

4. The apparatus of claim 1 wherein the control circuit generates the motor control signal so that the motor operates to produce a first torque which is increased to increase the torque of the motor when the pressure signal indicates that the pressure drop across the heat exchanger assembly is less than the reference pressure.

5. The apparatus of claim 4 further comprising a timer for timing a first interval of time during which the motor operates to produce the first torque and wherein the control circuit is responsive to the timer for generating the motor control signal so that the motor operates to incrementally increase the motor torque above the first torque if the pressure signal indicates that the pressure drop across the heat exchanger assembly is less than the reference pressure after the first interval of time is timed by the timer.

6. The apparatus of claim 5 wherein the timer further times a second interval of time less than the first interval of time during which the motor operates to produce a second torque greater than the first torque and wherein the control circuit is responsive to the timer for generating the motor control signal so that the motor operates to incrementally increase the motor torque above the second torque if the pressure signal indicates that the pressure drop across the heat exchanger assembly is less than the reference pressure after the second interval of time is timed by the timer.

7. The apparatus of claim 1 wherein the processor normalizes the determined motor torque to a reference speed and wherein the stored information includes a plurality of torque ranges and the retrieved parameter corresponds to one of the torque ranges which includes the normalized motor torque.

8. The apparatus of claim 1 wherein the furnace is operable in first and second operating states and the processor is responsive to the retrieved parameter for defining first and second sets of speed/torque curves corresponding to the desired pressure drop across the heat exchanger assembly for the first and second operating states, respectively, so that the motor operates in accordance with one or more of the first speed/torque curves when the furnace is in the first operating state and in accordance with one or more of the second speed/torque curves when the furnace is in the second operating state.

9. The apparatus of claim 1 wherein the furnace includes a furnace controller providing a furnace operating signal for causing the furnace to operate in either a high stage or a low stage and wherein the processor is responsive to the retrieved parameter for defining first and second sets of speed/torque curves corresponding to the desired pressure drop across the heat exchanger assembly for the high and low stages, respectively, so that the motor operates in accordance with one or more of the first speed/torque curves when the furnace is operating in the high stage and in accordance with one or more of the second speed/torque curves when the furnace is operating in the low stage.

10. The apparatus of claim 1 further comprising a furnace controller providing a furnace operating signal for causing the furnace to operate in either a high stage or a low stage and wherein the processor is responsive to the retrieved parameter for defining first and second sets of speed/torque curves corresponding to the desired pressure drop across the heat exchanger assembly for the high and low stages, respectively, so that the motor operates in accordance with one or more of the first speed/torque curves when the furnace is operating in the high stage and in accordance with one or more of the second speed/torque curves when the furnace is operating in the low stage.

11. The apparatus of claim 1 wherein the furnace discharges heated conditioned air to a space in response to a furnace operating signal and wherein the control circuit includes a furnace controller for generating the furnace operating signal corresponding to a desired operating condition of the furnace as a function of a thermostat signal from a thermostatic control, said thermostatic control providing the thermostat signal as a function of the temperature of the air in the space.

12. A motor for use with a furnace that includes a combustion chamber and an exhaust outlet for venting exhaust combustion chamber gases from the furnace and that also includes at least one heat exchanger assembly for extracting heat from the exhaust combustion chamber gases and transferring heat to conditioned air and a pressure switch providing a pressure signal representative of a reference pressure across the heat exchanger assembly, and for use with a fan for inducing a draft in the combustion chamber which causes a pressure drop across the heat exchanger assembly for moving the exhaust combustion chamber gases through the exhaust outlet, said motor comprising:

a shaft for driving the fan in response to a motor control signal;

a memory for storing information defining a relationship between motor speed, motor torque and parameters defining motor operation, said stored information including a table of predefined speed/torque values for defining a set of speed/torque curves;

a control circuit responsive to the pressure signal for generating the motor control signal to increase the torque of the motor when the pressure signal indicates that the pressure drop across the heat exchanger assembly is less than the reference pressure;

a processor for determining the speed and torque of the motor when the pressure drop corresponds to the reference pressure and for retrieving from the memory a retrieved parameter defining at least one delta value corresponding to the determined motor speed and motor torque, said processor adapting the predefined speed/torque values as a function of the delta value thereby to define the speed/torque curves corresponding to a desired pressure drop across the heat exchanger assembly, said control circuit generating the motor control signal in response to the defined set of speed/torque curves thereby to control the draft induced in the combustion chamber whereby the motor is operated as a function of the determined motor speed and motor torque when the pressure drop corresponds to the reference pressure.

13. A method of operating a draft inducer apparatus for use with a furnace that includes a combustion chamber and an exhaust outlet for venting exhaust combustion chamber gases from the furnace and that also includes at least one heat exchanger assembly for extracting heat from the exhaust combustion chamber gases and transferring heat to conditioned air, and for use with a fan for inducing a draft in the combustion chamber which causes a pressure drop across the heat exchanger assembly for moving the exhaust combustion chamber gases through the exhaust outlet, said method comprising the steps of:

driving the fan with a motor in response to a motor control signal;

storing information in a memory defining a relationship between motor speed, motor torque and parameters defining motor operation, said stored information including a table of predefined speed/torque values for defining a set of speed/torque curves;

providing a pressure signal representative of a reference pressure across the heat exchanger assembly;

generating the motor control signal in response to the pressure signal to increase the torque of the motor when the pressure signal indicates that the pressure drop across the heat exchanger assembly is less than the reference pressure;

determining the speed and torque of the motor when the pressure drop corresponds to the reference pressure;

retrieving from the memory a retrieved parameter defining at least one delta value corresponding to the determined motor speed and motor torque;

adapting the predefined speed/torque values as a function of the delta value thereby to define the speed/torque curves corresponding to a desired pressure drop across the heat exchanger assembly; and generating the motor control signal in response to the defined set of speed/torque curves thereby to control the draft induced in the combustion chamber whereby the motor is operated as a function of the determined motor speed and motor torque when the pressure drop corresponds to the reference pressure.

14. The method of claim 13 wherein the heat exchanger assembly includes a plurality of heat exchanger elements which determine furnace capacity, said furnace capacity affecting the pressure drop across the heat exchanger assembly, and wherein the delta value defined by wherein the retrieved parameter corresponds to the number of heat exchanger elements in the heat exchanger assembly, and further comprising the step of determining furnace capacity based on the number of heat exchanger elements wherein the adapting step includes adapting each of the predefined speed/torque values as a function of the defined delta value thereby to define a set of speed/torque curves corresponding to the desired pressure drop across the heat exchanger assembly based on the determined furnace capacity.

15. The method of claim 13 wherein the step of generating the motor control signal to increase the motor torque includes generating the motor control signal so that the motor operates to produce a first torque which is increased to increase the torque of the motor when the pressure signal indicates that the pressure drop across the heat exchanger assembly is less than the reference pressure.

16. The method of claim 15 further comprising the step of timing a first interval of time during which the motor operates to produce the first torque and wherein the step of generating the motor control signal to produce the first torque includes generating the motor control signal so that the motor operates to incrementally increase the motor torque above the first torque if the pressure signal indicates that the pressure drop across the heat exchanger assembly is less than the reference pressure after the first interval of time is timed.

17. The method of claim 16 further comprising the step of timing a second interval of time less than the first interval of time during which the motor operates to produce a second torque greater than the first torque and wherein the step of generating the motor control signal to incrementally increase the motor torque includes generating the motor control signal so that the motor operates to incrementally increase the motor torque above the second torque if the pressure signal indicates that the pressure drop across the heat exchanger assembly is less than the reference pressure after the second interval of time is timed.

18. The method of claim 13 further comprising the step of normalizing the determined motor torque to a reference speed and wherein the storing step includes storing a plurality of torque ranges in the memory and wherein the retrieved parameter corresponds to one of the plurality of torque ranges which includes the normalized motor torque.

19. The method of claim 13 wherein the furnace is operable in first and second operating states and wherein the defining step includes defining in response to the retrieved parameter first and second sets of speed/torque curves corresponding to the desired pressure drop across the heat exchanger assembly for the first and second operating states, respectively, so that the motor operates in accordance with one or more of the first speed/torque curves when the furnace is in the first operating state and in accordance with one or more of the second speed/torque curves when the furnace is in the second operating state.

20. The method of claim 13 wherein the furnace includes a furnace controller providing a furnace operating signal for causing the furnace to operate in either a high stage or a low stage and wherein the defining step includes defining in response to the retrieved parameter first and second sets of speed/torque curves corresponding to the desired pressure drop across the heat exchanger assembly for the high and low stages, respectively, so that the motor operates in accordance with one or more of the first speed/torque curves when the furnace is operating in the high stage and in accordance with one or more of the second speed/torque curves when the furnace is operating in the low stage.

21. The method of claim 13 further comprising the step of providing a furnace operating signal for causing the furnace to operate in either a high stage or a low stage and wherein the defining step includes defining in response to the retrieved parameter first and second sets of speed/torque curves corresponding to the desired pressure drop across the heat exchanger assembly for the high and low stages, respectively, so that the motor operates in accordance with one or more of the first speed/torque curves when the furnace is operating in the high stage and in accordance with one or more of the second speed/torque curves when the furnace is operating in the low stage.

22. The method of claim 13 wherein the furnace discharges heated conditioned air to a space in response to a furnace operating signal and further comprising the step of generating the furnace operating signal corresponding to a desired operating condition of the furnace as a function of a thermostat signal from a thermostatic control, said thermostatic control providing the thermostat signal as a function of the temperature of the air in the space.

23. A method of operating a motor for use with a furnace system that includes a combustion chamber and an exhaust outlet for venting exhaust combustion chamber gases from the furnace and that also includes at least one heat exchanger assembly for extracting heat from the exhaust combustion chamber gases and transferring heat to conditioned air and a pressure switch providing a pressure signal representative of a reference pressure across the heat exchanger assembly, and for use with a fan for inducing a draft in the combustion chamber which causes a pressure drop across the heat exchanger assembly for moving the exhaust combustion chamber gases through the exhaust outlet, said method comprising the steps of:

driving the fan with a shaft of the motor in response to a motor control signal;

storing information in a memory defining a relationship between motor speed, motor torque and parameters defining motor operation, said stored information including a table of predefined speed/torque values for defining a set of speed/torque curves;

generating the motor control signal in response to the pressure signal to increase the torque of the motor when the pressure signal indicates that the pressure drop across the heat exchanger assembly is less than the reference pressure;

determining the speed and torque of the motor when the pressure drop corresponds to the reference pressure;

retrieving from the memory a retrieved parameter defining at least one delta value corresponding to the determined motor speed and motor torque;

adapting the predefined speed/torque values as a function of the delta value thereby to define the speed/torque curves corresponding to a desired pressure drop across the heat exchanger assembly; and generating the motor control signal in response to the defined set of speed/torque curves thereby to control the draft induced in the combustion chamber whereby the motor is operated as a function of the determined motor speed and motor torque when the pressure drop corresponds to the reference pressure.

* * * * *